United States Patent
Faroe et al.

(10) Patent No.: US 10,873,793 B2
(45) Date of Patent: *Dec. 22, 2020

(54) METHOD AND APPARATUS FOR A DEPLOYABLE RADIO-FREQUENCY IDENTIFICATION PORTAL SYSTEM

(71) Applicant: QUAKE GLOBAL, INC., San Diego, CA (US)

(72) Inventors: Kiely Per Faroe, Purceville, VA (US); Christopher Lee Fennig, Ashburn, VA (US); Gordon Douglas Fraser, Ashburn, VA (US); Patrick J. Sweeney, II, Philomont, VA (US); David Vetter, Sheperdstown, WV (US)

(73) Assignee: QUAKE GLOBAL, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/583,014

(22) Filed: Sep. 25, 2019

(65) Prior Publication Data

US 2020/0045387 A1 Feb. 6, 2020

Related U.S. Application Data

(63) Continuation of application No. 15/639,939, filed on Jun. 30, 2017, now Pat. No. 10,484,761, which is a
(Continued)

(51) Int. Cl.
*H04Q 9/00* (2006.01)

(52) U.S. Cl.
CPC ........... *H04Q 9/00* (2013.01); *H04Q 2209/47* (2013.01)

(58) Field of Classification Search
CPC .... H04Q 9/00; H04Q 2209/47; G06K 7/0008; G06K 19/0723; G06K 19/07749; G06K 2017/0045; G07C 9/00111
See application file for complete search history.

(56) References Cited

U.S. PATENT DOCUMENTS

| | | |
|---|---|---|
| 4,479,994 A | 10/1984 | Berg |
| 4,636,950 A | 1/1987 | Caswell et al. |

(Continued)

FOREIGN PATENT DOCUMENTS

| | | |
|---|---|---|
| EP | 1727042 A1 | 11/2006 |
| WO | 9945495 A1 | 9/1999 |
| WO | 2006109700 A1 | 10/2006 |

OTHER PUBLICATIONS

International Search Report and Written Opinion received in PCT International application No. PCT/US2014/018650, dated Jun. 11, 2014, 8 pages.
(Continued)

*Primary Examiner* — Hai Phan
*Assistant Examiner* — Anthony D Afrifa-Kyei
(74) *Attorney, Agent, or Firm* — Procopio, Cory, Hargreaves & Savitch LLP

(57) ABSTRACT

An apparatus for interrogating radio-frequency identification (RFID) tags within an enclosure. In an embodiment, the apparatus comprises an RFID module, a first assembly comprising a processor, a second assembly comprising an RFID radiator operatively coupled to the RFID module, and a connection element coupled to the first assembly and second assembly such that the second assembly is movable relative to the first assembly between a first configuration and second configuration. The processor may be configured to interrogate RFID tags via the RFID module and RFID radiator when the second assembly is in the second configuration, and not interrogate RFID tags when the second assembly is in the first configuration. In addition, both the first assembly and the second assembly may comprise attachment components configured to removably couple its respective assembly to one or more surfaces of an enclosure.

20 Claims, 15 Drawing Sheets

Related U.S. Application Data continuation of application No. 14/611,636, filed on Feb. 2, 2015, now Pat. No. 9,699,526, which is a continuation of application No. 12/432,189, filed on Apr. 29, 2009, now Pat. No. 8,947,207.

(60) Provisional application No. 61/048,901, filed on Apr. 29, 2008.

(56) References Cited

U.S. PATENT DOCUMENTS

| | | |
|---|---|---|
| 4,854,319 A | 8/1989 | Tobin |
| 5,132,697 A | 7/1992 | Tan |
| 5,565,858 A | 10/1996 | Guthrie |
| 5,572,246 A | 11/1996 | Ellis et al. |
| 5,621,199 A | 4/1997 | Calari et al. |
| 5,649,295 A | 7/1997 | Shober et al. |
| 5,649,296 A | 7/1997 | MacLellan et al. |
| 5,740,623 A | 4/1998 | Juhan et al. |
| 5,742,237 A | 4/1998 | Bledsoe |
| 5,745,037 A | 4/1998 | Guthrie et al. |
| 5,774,876 A | 6/1998 | Woolley et al. |
| 5,778,309 A | 7/1998 | Tuttle et al. |
| 5,822,714 A | 10/1998 | Cato |
| 5,883,576 A | 3/1999 | De La Huerga |
| 5,920,593 A | 7/1999 | Perl et al. |
| 5,929,760 A | 7/1999 | Monahan |
| 5,959,568 A | 9/1999 | Woolley |
| 5,999,861 A | 12/1999 | Dove et al. |
| 6,011,597 A | 1/2000 | Kubo |
| 6,040,774 A | 3/2000 | Schepps |
| 6,078,787 A | 6/2000 | Schefte et al. |
| 6,104,291 A | 8/2000 | Beauvillier et al. |
| 6,104,295 A | 8/2000 | Gaisser et al. |
| 6,104,338 A | 8/2000 | Krasner |
| 6,107,960 A | 8/2000 | Krasner |
| 6,122,329 A | 9/2000 | Zai et al. |
| 6,141,387 A | 10/2000 | Zhang |
| 6,150,921 A | 11/2000 | Werb et al. |
| 6,177,861 B1 | 1/2001 | MacLellan et al. |
| 6,243,648 B1 | 6/2001 | Kilfeather et al. |
| 6,333,690 B1 | 12/2001 | Nelson et al. |
| 6,340,932 B1 | 1/2002 | Rodgers et al. |
| 6,449,317 B1 | 9/2002 | Critchlow et al. |
| 6,456,239 B1 | 9/2002 | Werb et al. |
| 6,476,756 B2 | 11/2002 | Landt |
| 6,480,108 B2 | 11/2002 | McDonald |
| 6,486,769 B1 | 11/2002 | McLean |
| 6,501,807 B1 | 12/2002 | Chieu et al. |
| 6,529,883 B1 | 3/2003 | Yee et al. |
| 6,566,997 B1 | 5/2003 | Bradin |
| 6,587,516 B2 | 7/2003 | Critchlow et al. |
| 6,608,551 B1 | 8/2003 | Anderson et al. |
| 6,621,410 B1 | 9/2003 | Lastinger et al. |
| 6,625,454 B1 | 9/2003 | Rappaport et al. |
| 6,650,240 B2 | 11/2003 | Lee et al. |
| 6,658,237 B1 | 12/2003 | Rozenblit et al. |
| 6,661,399 B1 | 12/2003 | Oh et al. |
| 6,687,609 B2 | 2/2004 | Hsiao et al. |
| 6,700,547 B2 | 3/2004 | Mejia et al. |
| 6,707,422 B2 | 3/2004 | Sheynblat et al. |
| 6,714,121 B1 | 3/2004 | Moore |
| 6,724,308 B2 | 4/2004 | Nicholson |
| 6,728,326 B1 | 4/2004 | Fulghum |
| 6,747,561 B1 | 6/2004 | Reeves |
| 6,762,714 B2 | 7/2004 | Cohen et al. |
| 6,771,399 B1 | 8/2004 | Batten |
| 6,784,789 B2 | 8/2004 | Eroglu et al. |
| 6,799,023 B2 | 9/2004 | Pinola et al. |
| 6,803,856 B1 | 10/2004 | Murphy et al. |
| 6,804,537 B1 | 10/2004 | Fujii |
| 6,828,902 B2 | 12/2004 | Casden |
| 6,836,215 B1 | 12/2004 | Laurash et al. |
| 6,860,422 B2 | 3/2005 | Hull et al. |
| 6,882,861 B2 | 4/2005 | Panasik et al. |
| 6,888,502 B2 | 5/2005 | Beigel et al. |
| 6,894,600 B2 | 5/2005 | Phelan |
| 6,927,687 B2 | 8/2005 | Carrender |
| 6,940,408 B2 | 9/2005 | Ferguson et al. |
| 7,009,517 B2 | 3/2006 | Wood |
| 7,023,346 B2 | 4/2006 | Balch et al. |
| 7,026,935 B2 | 4/2006 | Diorio et al. |
| 7,039,359 B2 | 5/2006 | Martinez |
| 7,080,061 B2 | 7/2006 | Kabala |
| 7,084,740 B2 | 8/2006 | Bridgelall |
| 7,084,750 B2 | 8/2006 | Johanning et al. |
| 7,132,948 B2 | 11/2006 | Sweeney, II |
| 7,168,626 B2 | 1/2007 | Lerch et al. |
| 7,212,120 B2 | 5/2007 | Gudat |
| 7,213,767 B2 | 5/2007 | Tethrake et al. |
| 7,225,992 B2 | 6/2007 | Forster |
| 7,240,446 B2 | 7/2007 | Bekker |
| 7,253,717 B2 | 8/2007 | Armstrong et al. |
| 7,256,682 B2 | 8/2007 | Sweeney, II |
| 7,262,701 B1 | 8/2007 | Nguyen |
| 7,298,270 B2 | 11/2007 | Ishiguro et al. |
| 7,312,752 B2 | 12/2007 | Smith et al. |
| 7,323,991 B1 | 1/2008 | Eckert et al. |
| 7,345,575 B2 | 3/2008 | Tuttle et al. |
| 7,357,318 B2 | 4/2008 | Honda |
| 7,362,210 B2 | 4/2008 | Bazakos et al. |
| 7,405,656 B2 | 7/2008 | Olsen |
| 7,411,921 B2 | 8/2008 | Strong et al. |
| 7,414,533 B2 | 8/2008 | Sweeney, II |
| 7,416,122 B2 | 8/2008 | Sato |
| 7,463,142 B2 | 12/2008 | Lindsay |
| 7,484,664 B2 | 2/2009 | Shafer |
| 7,538,681 B1 | 5/2009 | Sharma et al. |
| 7,562,445 B2 | 7/2009 | Lerch et al. |
| 7,607,249 B2 | 10/2009 | Singleton |
| 7,636,032 B2 | 12/2009 | Kantrowitz et al. |
| 7,658,026 B2 | 2/2010 | Jain et al. |
| 7,716,160 B2 | 5/2010 | Smith et al. |
| 7,722,388 B1 | 5/2010 | Michaeli et al. |
| 7,743,540 B2 | 6/2010 | McDermott |
| 7,789,308 B2 | 9/2010 | Droms et al. |
| 7,815,101 B2 | 10/2010 | Shafer |
| 7,835,954 B2 | 11/2010 | Banerjee |
| 7,849,619 B2 | 12/2010 | Mosher, Jr. et al. |
| 8,193,935 B2 | 6/2012 | Gates |
| 8,225,540 B2 | 7/2012 | Shigaraki |
| 8,267,325 B2 | 9/2012 | Phaneuf |
| 8,296,982 B2 | 10/2012 | Bekker |
| 8,570,156 B2 | 10/2013 | Barvick et al. |
| 8,636,220 B2 | 1/2014 | Warther |
| 9,627,717 B1 | 4/2017 | Langlois et al. |
| 9,699,526 B2 * | 7/2017 | Faroe ................ H04Q 9/00 |
| 2001/0040507 A1 | 11/2001 | Eckstein et al. |
| 2002/0013162 A1 * | 1/2002 | Whitney ............. H04M 1/253 |
| | | 455/557 |
| 2002/0080567 A1 | 6/2002 | Bone et al. |
| 2002/0098864 A1 | 7/2002 | Mukai et al. |
| 2002/0119770 A1 | 8/2002 | Twitchell, Jr. |
| 2003/0034390 A1 | 2/2003 | Linton et al. |
| 2003/0083758 A1 | 5/2003 | Williamson |
| 2003/0101343 A1 | 5/2003 | Eaton et al. |
| 2003/0137968 A1 | 7/2003 | Lareau et al. |
| 2003/0174839 A1 | 9/2003 | Yamagata et al. |
| 2003/0224761 A1 | 12/2003 | Goto |
| 2003/0233189 A1 | 12/2003 | Hsiao et al. |
| 2004/0008114 A1 | 1/2004 | Sawyer |
| 2004/0020012 A1 | 2/2004 | Gupte |
| 2004/0160306 A1 | 8/2004 | Stilp |
| 2004/0212493 A1 | 10/2004 | Stilp |
| 2005/0007290 A1 * | 1/2005 | Aisenbrey ............. H01Q 9/40 |
| | | 343/797 |
| 2005/0012613 A1 | 1/2005 | Eckstein et al. |
| 2005/0033688 A1 * | 2/2005 | Peart .................. G06Q 20/20 |
| | | 705/39 |
| 2005/0106376 A1 | 5/2005 | Leung et al. |
| 2005/0108912 A1 | 5/2005 | Bekker |
| 2005/0109844 A1 | 5/2005 | Hilliard |
| 2005/0154570 A1 | 7/2005 | Sweeney |
| 2005/0154572 A1 | 7/2005 | Sweeney |

(56) References Cited

U.S. PATENT DOCUMENTS

| | | |
|---|---|---|
| 2005/0200483 A1 | 9/2005 | Eckstein et al. |
| 2005/0212660 A1 | 9/2005 | Hansen et al. |
| 2005/0222999 A1 | 10/2005 | Nihei |
| 2005/0231370 A1 | 10/2005 | Tagato |
| 2005/0237157 A1 | 10/2005 | Cooper et al. |
| 2005/0242958 A1 | 11/2005 | Lyon et al. |
| 2006/0011686 A1 | 1/2006 | Latham |
| 2006/0022800 A1 | 2/2006 | Krishna et al. |
| 2006/0022801 A1 | 2/2006 | Husak |
| 2006/0049944 A1 | 3/2006 | Ishiguro et al. |
| 2006/0066443 A1 | 3/2006 | Hall |
| 2006/0082444 A1 | 4/2006 | Sweeney et al. |
| 2006/0092014 A1 | 5/2006 | Onderko et al. |
| 2006/0158313 A1 | 7/2006 | Satou |
| 2006/0170565 A1 | 8/2006 | Husak |
| 2006/0175407 A1 | 8/2006 | Kinoshita |
| 2006/0187203 A1* | 8/2006 | Piraneque ............... G09G 3/00 345/158 |
| 2006/0226805 A1 | 10/2006 | Yu |
| 2006/0250249 A1 | 11/2006 | Cheng |
| 2006/0281864 A1 | 12/2006 | Nelson |
| 2007/0024425 A1 | 2/2007 | Nitzan et al. |
| 2007/0040687 A1 | 2/2007 | Reynolds |
| 2007/0046369 A1 | 3/2007 | Schober et al. |
| 2007/0069022 A1 | 3/2007 | Hatakeyama et al. |
| 2007/0075834 A1 | 4/2007 | Armstrong et al. |
| 2007/0106172 A1 | 5/2007 | Abreu |
| 2007/0109121 A1 | 5/2007 | Cohen |
| 2007/0132583 A1 | 6/2007 | Sweeney |
| 2007/0136036 A1 | 6/2007 | Sweeney et al. |
| 2007/0141997 A1 | 6/2007 | Wulff et al. |
| 2007/0182556 A1 | 8/2007 | Rado |
| 2007/0194914 A1 | 8/2007 | Gates |
| 2007/0200707 A1 | 8/2007 | Sweeney |
| 2007/0222591 A1 | 9/2007 | Kimata |
| 2007/0229216 A1 | 10/2007 | Yasuda |
| 2007/0229280 A1 | 10/2007 | Akiguchi et al. |
| 2007/0252701 A1 | 11/2007 | Berry et al. |
| 2008/0018468 A1 | 1/2008 | Volpi et al. |
| 2008/0022290 A1 | 1/2008 | Ochiai et al. |
| 2008/0111674 A1 | 5/2008 | Quine |
| 2008/0198016 A1 | 8/2008 | Lawrence et al. |
| 2008/0207282 A1* | 8/2008 | Schaffler ................ H04B 5/02 455/575.3 |
| 2008/0234862 A1 | 9/2008 | Funada et al. |
| 2008/0250117 A1 | 10/2008 | Nihei |
| 2008/0278292 A1 | 11/2008 | Nierenberg et al. |
| 2008/0290472 A1 | 11/2008 | Yagihashi et al. |
| 2009/0045916 A1 | 2/2009 | Nitzan et al. |
| 2009/0101712 A1 | 4/2009 | Ulrich et al. |
| 2009/0128360 A1 | 5/2009 | Bianchi et al. |
| 2009/0174569 A1 | 7/2009 | Smith et al. |
| 2009/0210940 A1* | 8/2009 | Dean ...................... G06F 21/35 726/19 |
| 2009/0239593 A1* | 9/2009 | Jayasinghe ............ H01Q 1/088 455/575.1 |
| 2009/0256757 A1 | 10/2009 | Chiang et al. |
| 2009/0261956 A1 | 10/2009 | Ojeda et al. |
| 2009/0322510 A1 | 12/2009 | Berger et al. |
| 2010/0007498 A1 | 1/2010 | Jackson |
| 2010/0039228 A1 | 2/2010 | Sadr et al. |
| 2010/0056873 A1 | 3/2010 | Allen et al. |
| 2010/0096461 A1 | 4/2010 | Kotlarsky et al. |
| 2010/0097194 A1 | 4/2010 | Killian et al. |
| 2010/0250305 A1 | 9/2010 | Lee et al. |
| 2010/0271212 A1 | 10/2010 | Page |
| 2011/0041370 A1 | 2/2011 | Saint et al. |
| 2011/0050400 A1 | 3/2011 | Ho et al. |
| 2011/0121082 A1 | 5/2011 | Phaneuf |
| 2011/0156907 A1 | 6/2011 | Nagai |
| 2011/0226861 A1 | 9/2011 | Warther |
| 2011/0266343 A1 | 11/2011 | Liu |
| 2012/0092134 A1 | 4/2012 | Stern et al. |
| 2012/0235870 A1 | 9/2012 | Forster |
| 2013/0009751 A1 | 1/2013 | Sato et al. |
| 2013/0057390 A1 | 3/2013 | Watt et al. |
| 2013/0099898 A1 | 4/2013 | Bloy |
| 2014/0203914 A1 | 7/2014 | Sadr et al. |
| 2014/0292494 A1 | 10/2014 | Sadr et al. |
| 2014/0292497 A1 | 10/2014 | Horst et al. |
| 2014/0361077 A1 | 12/2014 | Davidson |
| 2014/0378853 A1 | 12/2014 | McKinney et al. |
| 2015/0235060 A1 | 8/2015 | Liao et al. |

OTHER PUBLICATIONS

Harmon, Craig, "Lads, Dads, Grand- & Great-Grand Dads," QED Systems, presented at RFID workshop on Apr. 24, 2001, 1 page.

QED Systems, "Unit loads and transport packages for North American border crossings," MH10 Ballot approved PINS Sep. 15, 2006, 5 pages.

Sorrells, Pete, "Passive RFID Basics," 1998, Microship Technology Inc., 7 pages.

* cited by examiner

METHOD AND APPARATUS FOR A DEPLOYABLE RADIO-FREQUENCY IDENTIFICATION PORTAL SYSTEM

CROSS-REFERENCE TO RELATED APPLICATIONS

This application is a continuation of U.S. patent application Ser. No. 15/639,939, filed on Jun. 30, 2017, which is a continuation of U.S. patent application Ser. No. 14/611,636, filed on Feb. 2, 2015, which is a continuation of U.S. patent application Ser. No. 12/432,189, filed on Apr. 29, 2009, which claims priority to U.S. Provisional Patent App. No. 61/048,901, filed on Apr. 29, 2008, which are all hereby incorporated herein by reference as if set forth in full.

BACKGROUND

Embodiments relate generally to radio-frequency identification (RFID) portal systems, and, in particular, to methods and apparatus for a deployable RFID portal system.

RFID portal systems have been deployed historically using expensive, permanently wall-mounted commercial off-the-shelf (COTS) hardware. This approach is convenient in the context of a static distribution center, for example, where wall power and Ethernet access are relatively cheap and available. The RFID technology, however, often used within, for example, the confines of a non-static distribution center fails to address the requirements of an environment that is remote, austere, and/or mobile.

A few examples of such environments include but are not limited to the "last tactical mile" of military operations and transcontinental commercial shipping operations. Often, the US military is unable to use mission critical assets simply because they cannot be found in a timely manner. Additionally, logistics companies responsible for shipping products from one country to another lack the level of shipping verification and visibility needed to track and trace shipments effectively. Accordingly, methods and apparatus are needed to address the shortfalls of known systems. For example, a need exists for methods and apparatus for semi-mobile applications where the infrastructure does not move relative to the enclosure (e.g., container), but the enclosure itself may travel great distances.

SUMMARY

In one embodiment, an apparatus includes a first assembly, a second assembly, and a coupling element coupled to the first assembly and the second assembly. The first assembly includes a processor, a memory, and a radiator module, the processor operatively coupled to the memory and the radiator module. The second assembly includes a radiator operatively coupled to the radiator module. The second assembly is movable relative to the first assembly about the coupling element between a first configuration and a second configuration. The processor is configured to interrogate a radio-frequency identification module via the radiator module and the radiator when the second assembly is in the second configuration.

DETAILED DESCRIPTION

Figure 1:
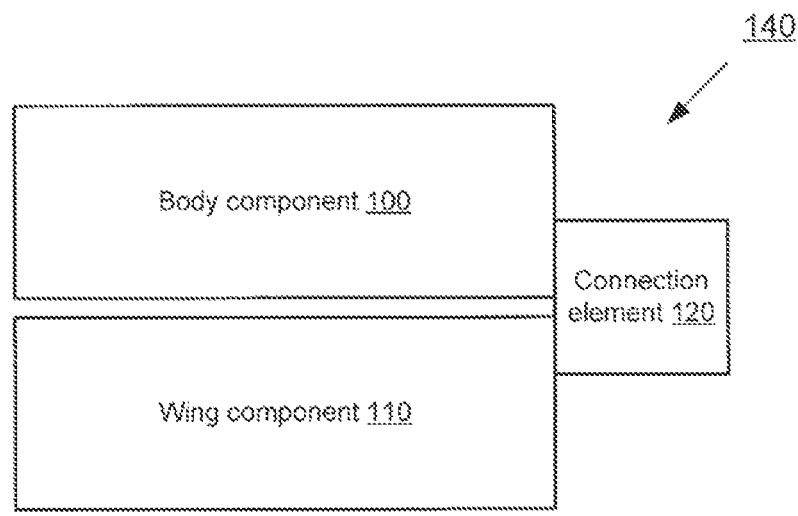
FIG. 1 is a schematic diagram that illustrates a deployable inventorying system (DIS) that includes at least one body and may include at least one wing, according to an embodiment.

One or more embodiments relate to methods and apparatus for rapidly deployable inventorying systems ("DIS"). When deployed (also can be referred to as installed) within an enclosure, the enclosure can be referred to as a self-inventorying enclosure system ("SIES"). A DIS can be configured to identify the contents of a SIES (e.g., shipping container, barrel, box, crate, vending machine, server rack, etc.) without human intervention by combining passive, semi-passive, semi-active, and/or active radio-frequency identification ("RFID") technology with data communications technologies and management software.

Some embodiments of DIS technology allow for object identification at a distance and out-of-line of sight. Such embodiments can include transponders called radio-frequency ("RF") tags or RFID tags (also can be referred to as "RF tag modules," "RFID tag modules," "RF modules," or "RFID modules") and RF interrogators (also can be referred to as "RFID readers" or "readers"). RF tags (or RF tag modules, RFID tag modules, RF modules, and RFID modules) can include RF tags separate from other devices or circuitry and/or RF tags included with or coupled to additional circuitry. The RF tags can be smaller, sometimes as small as a grain of rice, sometimes less expensive than interrogators, and can be attached to, for example, objects such as product packages in stores. When an interrogator is within range of an RF tag and when the interrogator is activated, the interrogator may provide power to the tag via a querying signal. Sending an RF tag a querying signal can also be referred to as interrogating the RF tag. In some embodiments, the RF tag can use stored power from a battery or a capacitor, or from other power storage or power harvesting devices, components, or systems, to send a radio-frequency signal to be read by the RFID interrogator. In some embodiments, interrogating an RF tag can include sending a querying signal to an RF tag and receiving a signal (or interrogation response) from the RF tag.

RF tags can include a single integrated circuit, circuits, and/or antennas (also can be referred to as a radiator). Some RF tags may be configured to compute one or more values, store data, and sense various signals and/or environmental conditions using a sensor. Some categories of RFID tags include the following: passive tags that acquire power via the electromagnetic field emitted by the interrogator; semi-passive tags that respond similarly, but also use on-board stored power for other functions; active tags that use their own stored power to respond to an interrogator's signal; inductively coupled tags that operate at short distances via a coil antenna; single or dual dipole antenna-equipped tags that operate at relatively high frequencies and long distances; read-write tags that can alter data stored upon them; full-duplex or half duplex tags; collision arbitration tags that may be read in groups; non-collision tags that are read individually; Ultra-Wideband carrier-free, baseband, or impulse (e.g., short pulse electromagnetic) tags; and/or a radio wave pulse that is directly converted into a nanoscale surface acoustic wave ("SAW") on the SAW chip surface.

DIS technology can have a number of advantages over some object marking and tracking systems. A radio-frequency interrogator associated with a DIS may be able to read a tag when it is not in line of sight from the interrogator, when the tag is dirty, or when an enclosure obscures the tag. A DIS system can be configured to identify objects at greater distances than optical systems, can store information into read/write tags, need not require a human operator, and/or can be configured to read tags hidden from visual inspection for security purposes. These advantages make a DIS useful for, for example, tracking objects.

DIS technology can be less expensive to implement than conventional data capture methods that do not involve RFID technology. The DIS can be configured to use passive tags that may be very low cost per unit, facilitating widespread use. DIS can be used in a shipping and/or warehousing environment with large enclosures on pallets, which often contain nested enclosures, and/or inexpensive passive tags on individual objects. DIS can also use active tags, which have greater range and are practical in many instances because of cost and shelf life. A DIS can use multiple tag types for groups of objects in potentially mobile enclosures. The DIS can be configured to deliver a high read rate under a variety of conditions, at a distance, and at a reasonable cost relative to a stationary RFID system. A DIS can be configured to be compatible with a variety of environments and tag types.

In some embodiments of the DIS, the DIS can include one or more wing assemblies that can include one or more radiators (e.g., antenna). In some embodiments of the DIS, master wings may communicate with another assembly of the DIS such as a control assembly through wired or wireless communications. Internal wireless communications methods can include, but are not limited to Bluetooth, 802. 1x (e.g., 802.11a, 802.11b, 802.11g, 802.11n, 802.15), Wireless USB, Dedicated Short Range Communications ("DSRC"), Ultra-Wideband ("UWB"), and infrared. In some embodiments of the DIS, all or substantially all outside communications devices may be turned off, disconnected, or removed, depending on end user requirements, to facilitate secure tracking without potential interference, interaction, or data modification, from external sources without the originators knowledge and/or permission. Data collected by a DIS may be encrypted for additional security with a unique key held only by authorized parties.

In some embodiments of the DIS, sensors may be embedded to allow for localized information gathering, which can be used to trigger events such as, but not limited to openings, closings, light detection, and hazard detection; status recording such as, but not limited to temperature, humidity, shock, and vibration; and other functions as requested by the end user.

In some embodiments of the DIS, power recharging can be accomplished through multiple sources and/or methods, such as, but not limited to the use of solar, thermal, piezoelectric, magnetic, vibration, and radio-frequency. In some embodiments of the DIS, the units can be deployable in items such as, but not limited to utility vehicles, small parcel delivery vehicles, shipboard holds and shipboard areas, railcars, tractor trailers, and aircraft.

FIG. 1 is a schematic diagram that illustrates a DIS 140 that includes at least one body component (also referred to as an "assembly") 100 and at least one wing component (also referred to as an "assembly") 110, according to an embodiment. The body component 100 and the wing component 110 can be operatively coupled by a connection component (or connection element) 120. In some embodiments, body component 100 can include (not shown in FIG. 1) one or more of a primary power supply, an RFID interrogator, a processor such as a central processing unit (CPU) (e.g., a CPU with data storage capacity), a memory, a communication modem, a sensor (e.g., a door status sensor, an electromagnetic radiation sensor, a vibration sensor, a temperature sensor, a pressure sensor, etc.), and/or an interconnection (e.g., a physical interconnection, a wireless interconnection) between one or more of these components.

In some embodiments, connection component 120 can include, for example, a hinge and/or a wire configured to communicate a signal. In some embodiments, connection component 120 can include a dual hinge that is configured to move about two axes. In some embodiments, body component 100 and/or wing component 110 can include an attachment component or device (not shown) such as a strap, a latch, or other coupler configured to secure wing component 110 to body component 100 such that movement of swing component 110 relative to body component 100 is restricted or reduced.

In some embodiments, DIS 140 can have a software portion and/or a hardware portion configured to manage the components of DIS 140 (e.g., monitor operations, control operations at a desirable level, control operations within specified parameter values, maintain operations). In some embodiments, the software and/or hardware of DIS 140 can have embedded business logic. In some embodiments, wing component 110 can include one or more RFID interrogation antennas, a specialized radome to house the antenna, a set of magnets (e.g., series of magnets), and/or a detachment component (also can be referred to as detachment hardware or quick detachment hardware).

As shown in FIG. 1, DIS 140 is in an undeployed state with wing component 110 being stowed near body component 100. In this embodiment, while DIS 140 is in the undeployed state, wing component 110 can be physically attached to body component 100. Wing component 110 can be stowed using, for example, an attachment component or device (not shown), such as a strap, a magnet, a snap, a latch, a suction cup, a screw, a portion of Velcro, double-sided tape, a press fit, a tension fit, and so forth. The attachment component can be used to facilitate ease of handling and installation. In some embodiments, wing component 110 can at least partially be stowed within a housing (not shown) associated with body component 100, and vice versa.

In some embodiments, DIS 140 can include additional wing components and/or body components. For example, DIS 140 can include another wing component similar to wing component 110 operatively coupled to body component 100. In some embodiments, additional wing components can be coupled to a body component with additional connection components similar to connection components 120.

Figure 2:
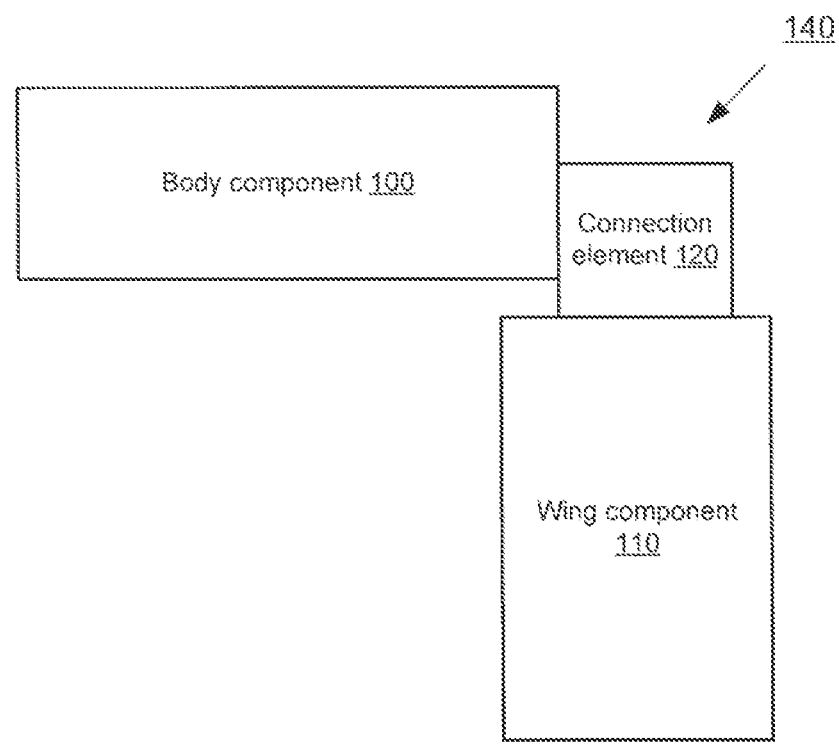
FIG. 2 is a schematic diagram that illustrates the DIS of FIG. 1 in a deployed state, according to an embodiment.

FIG. 2 is a schematic diagram that illustrates DIS 140 of FIG. 1 in a deployed state, according to an embodiment. As shown in FIG. 2, wing component 110 has been rotated away from body component 100 by approximately 90 degrees. In some embodiments, wing 110 can be rotated and/or twisted away from the body component 100 at a variety of angles (e.g., obtuse angles, acute angles). In some embodiments, wing component 110 rotates, twists, or moves about connection component 120. For example, connection component 120 can be a hinge configured to move about one or more axes. Wing component 120 can move about those axes during movement (also referred to as conversion) from the undeployed state to the deployed state, and during movement (also referred to as conversion) from the deployed state to the undeployed state. In some embodiments, connection component 120 is a cable or wire movable in many directions or with many degrees of freedom, and wing component 110 can move about connection component in any of those directions or within those degrees of freedom.

In some embodiments, a DIS can include two wing components each operatively coupled to a body component by a connection component. That is, such a DIS can include two wing components, two connection components, and the body component. The connection components, body component, and/or wing components can include a locking mechanism configure to lock or fix each wing component in a deployed state. In some embodiments, the DIS can be free-standing in the deployed state. In other words, the wing components can function as legs or supports for the DIS in the deployed state, and the DIS can stand on the wing components. In some embodiments, the locking mechanism can be configured to be disengaged such that the DIS can be returned to the undeployed state, for example, for storage.

Figure 3:
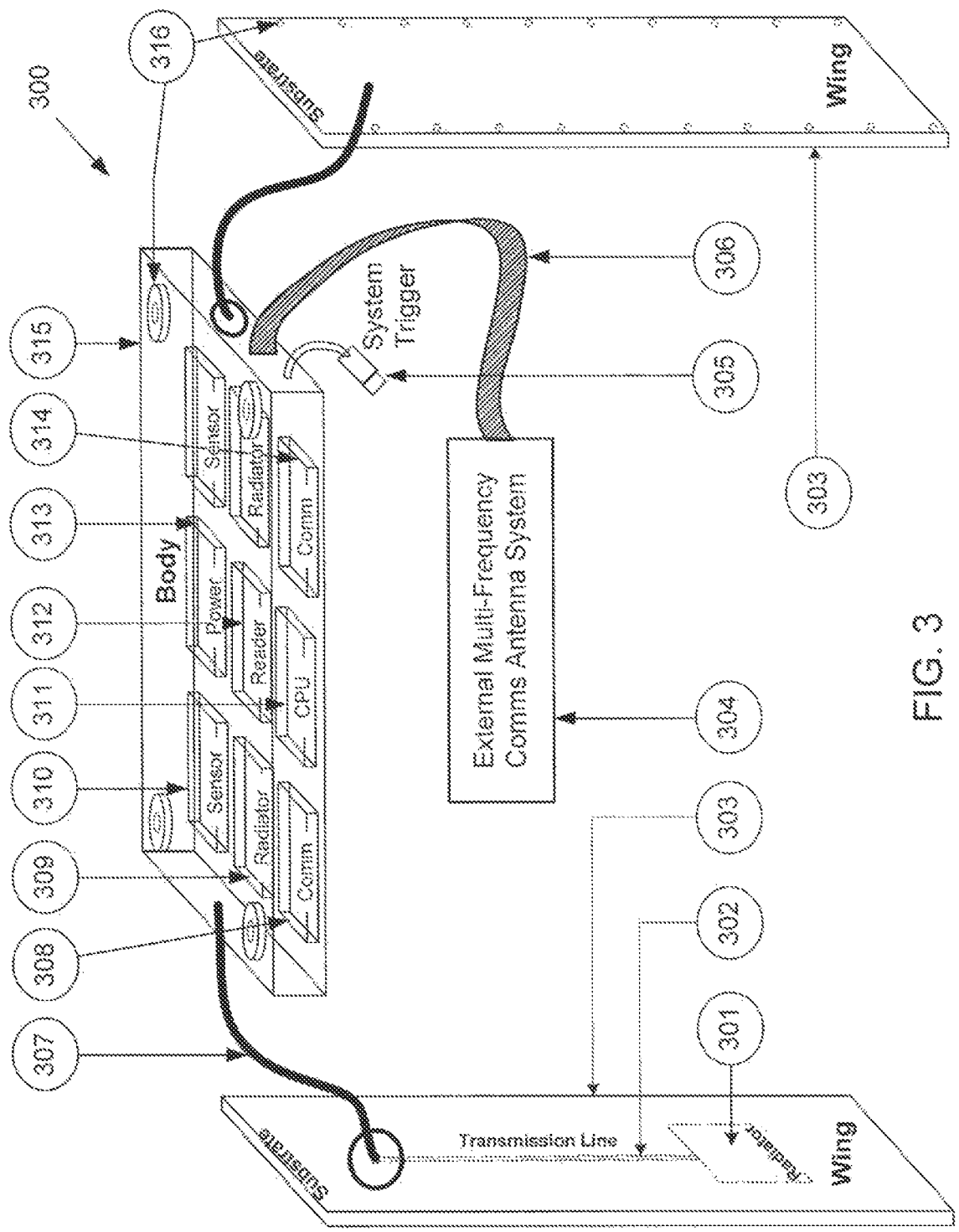
FIG. 3 is a schematic diagram illustrating one version of the components of a DIS, according to an embodiment.

FIG. 3 is a schematic diagram illustrating components of an embodiment of DIS 300, according to an embodiment. The DIS 300 can be configured with components that enable the DIS 300 to install a functional interrogation zone without requiring tools, or specialized RFID skill or knowledge. An interrogation zone is an area in which RF tagged items can be placed to be within the effective coverage of the DIS. In other words, DIS 300 can be configured to be deployed, powered on, and function without additional configuration input from an end user.

DIS 300 includes a body 315, one or more wing assemblies (or wings) 303, an external multi-frequency communications antenna system 304, and a system trigger 305. Additionally, body 315 and wing assemblies 303 each includes one or more attachment devices or elements 316 configured to attach DIS 300 to inside surfaces of an enclosure such as, for example, a container, a utility vehicle, a small parcel delivery vehicle, a shipboard hold or shipboard area, a railcar, a tractor trailer, or an aircraft. In some embodiments, body 315 can be referred to as a control assembly. In some embodiments, a wing can be a fabric antenna including a radiator. System trigger 305 can be used, for example, to activate and/or deactivate DIS 300. For example, system trigger 305 can be a switch operatively coupled to an opening such as a door of a shipping container or other enclosure in which DIS 300 is deployed. DIS 300 can be activated by system trigger 305 when the door is closed and deactivated when the door is open. In other embodiments, DIS 300 can be activated once when the door closes and once again when the door is opened. Each wing 303 can contain a radiator/receptor 301 and a transmission line 302. Once transmission line 302 is disposed outside of the wing 303, transmission line 302 can be protected as part of the ruggedized transmission line 307. Transmission line 307 can be ruggedized, for example, by enclosing transmission line 302 in a protective housing such as a rubber, plastic, or metal housing. In some embodiments, transmission line 307 can be flexible or semi-flexible such that wings 303 are movable with respect to body 315.

External multi-frequency communications antenna system 304 can be placed outside the enclosure and connected to body 315 via a ruggedized coaxial ribbon cable 306. A satellite modem 308 (labeled as "Comm"), body radiator/receptor 309 (labeled as "Radiator"), optional sensors (i.e. light, shock, vibration, temperature) 310 (labeled as "sensor"), central processing unit (also referred to as "CPU" or "processor") 311, reader (or "interrogator") 312, communications modems (e.g., Wi-Fi™, GSM, GPRS, ZigBee™, Bluetooth™, mesh) 314 (labeled as "Comm"), and/or a power supply 313 (labeled as "Power") can be included, coupled to, or disposed within body 315. Some system components (e.g., body 315, wings 303, system trigger 305, and/or external multi-frequency communications antenna system 304) can be coupled to the enclosure surfaces with quick-mounting hardware including but not limited to: magnets, snaps, latch system, screw, Velcro, double-sided tape, etc.

In some embodiments, a memory (not shown) and/or a data interface (not shown) can also be included with, disposed with or operatively coupled to body 315. A memory can be, for example, magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as optical disks; random access memories ("RAMs"); solid-state memory such as FLASH memory; and/or other types or classes of memory. In some embodiments, a memory can be an array of memory devices. For example, a memory can include a redundant array of independent/inexpensive disks ("RAID") that provides improved memory performance and/or redundancy. In some embodiments, DIS 300 includes a primary memory and a backup memory. For example, DIS 300 can include a memory for primary storage of data and a RAID memory providing redundant backup of data. In some embodiments, a memory can be modular, or removable as a unit. For example, the backup RAID memory can be removed and replace with another backup memory. In other embodiments, a modular or removable memory can be a memory card such as a compact FLASH ("CF") card, a secure digital ("SD") card, or some other memory card, or some other removable memory device such as a Universal Serial Bus ("USB") external hard drive, a USB FLASH drive or stick.

A data interface can be, for example, an interface to a memory such as a FLASH memory or a hard disk such as a mechanical hard disk or a solid-state disk ("SSD"). For example, a data interface can be a Universal Serial Bus ("USB") controller and port, an Ethernet controller and port, an External Serial AT Attachment ("eSATA") controller and port, and/or other interface. Data stored at the memory (not shown) can be accessed (e.g., copied or downloaded) to an external device via the data interface. In some embodiments, processor 311 can be operatively coupled to the data interface and can detect when a device is operatively coupled to the data interface. For example, the data interface can be a USB interface, and processor 311 can detect when a data storage device is operatively coupled to the USB interface. In some embodiments, processor 311 can automatically upload data to a data storage device operatively coupled to the USB interface. For example, processor 311 can store data acquired during interrogation of RF tags at a memory (not shown). When processor 311 detects that a data storage device is operatively coupled to a data interface (not shown), processor 311 can upload the data from the memory to the data storage device. In some embodiments, processor 311 is configured to upload a portion of the data stored at the memory to the data storage device via the data interface. For example, processor 311 can upload changes to the data stored at the memory since a previous upload of the data stored at the memory via the data interface.

In some embodiments, DIS 300 can include an authentication or authorization module (not shown) such as, for example, a keypad (such as a physical keypad or a virtual keypad displayed on a touch-sensitive display) or a biometric security module (such as a fingerprint reader, a voice identification module, or an eye scanner). DIS 300 can authenticate a user based on a credential (or some other authentication or authorization information) such as a pass code or encryption key input via the keypad, or based on one or more biometric parameters determined by the biometric security module before providing access to data stored at DIS 300. For example, a user can authenticate with DIS 300 before downloading data via a data interface (not shown). In some embodiments, DIS 300 can destroy or delete data stored at DIS 300 if a user fails to authenticate after a predetermined number of attempts. For example, if a user fails to enter a correct pass code via a keypad (not shown) three times, DIS 300 can delete all data stored at a memory (not shown) of DIS 300. In some embodiments, DIS 300 can upload the data to a secure storage repository via satellite modem 308 and/or communications modems 314 before deleting the data stored at the memory. In some embodiments, DIS 300 can be configured to self-destruct (e.g., short circuit or over-power electrical components) if a user fails to authenticate. In some embodiments, a credential can be a digital certificate or encryption key input via a communication modem or data interface (e.g., for a remote operator). In some embodiments, a credential can be a pass code generated by a hardware token and input to the DIS, for example, via a data interface or keypad. In some embodiments, a credential is generated or defined using, for example, encryption or a hash based on a pass code, a biometric parameter, a digital certificate, or an encryption key.

In some embodiments, the components included within and/or operatively coupled to body 315 can be operatively coupled one to another via interconnects and/or communications busses (e.g., RS485 busses). Such interconnects and/or communications busses can be electrical connections, optical connections, acoustic connections, RF connections, and/or other connections. For example, processor 311 can be operatively coupled to a memory (not shown), satellite modem 308, system trigger 305, body radiator/receptor 309, optional sensors 310, interrogator 312, communications modems 314, power supply 315, and/or other components. In some embodiments, the components within and/or operatively coupled to body 315 can be operatively coupled one to another heterogeneously via different types of classes interconnects. For example, processor 311 can be operatively coupled to a memory (not shown), body radiator/receptor 309, optional sensors 310, and interrogator 312 via an RS485 connection, and to satellite modem 308 and communications modems 314 via a network connection such as an Ethernet connection.

Some components of DIS 300 can be automatically detected, and other components can be configured manually. For example, processor 311 can be configured to execute system software such as an operating system ("OS") (e.g., an embedded operating system or a real-time operating system). The system software can automatically detect and configure some system components (e.g., a memory (not shown), satellite modem 308, and communications modems 314) such that those components can be used by the DIS without further configuration. The system software can use operator input, configuration files, and/or other information separate from the system software to detect and/or configure other components (e.g., system trigger 305, body radiator/receptor 309, optional sensors 310, and interrogator 312). In other words, DIS 300 can be configured to meet end user needs and requirements.

In some embodiments, the DIS 300 can be self-sufficient in that it does not require (or substantially does not require) an external power source (e.g., connection to a wall outlet) or a physical line connection to interface with other systems. For example, power supply 313 can be a battery that provides operational power to the components of DIS 300.

Satellite modem 308 and/or communications modems 314 can provide remote access to DIS 300. For example, DIS 300 can be installed within a shipping container, external multi-frequency communications antenna system 304 can be operatively coupled to satellite module 308 and communications modems 314, and external multi-frequency communications antenna system 304 can be installed outside the shipping container. An operator can send operations commands to and/or access data stored at DIS 300 using a computing device such as a computer terminal, personal digital assistant ("PDA"), smart phone, or other computing device that is operatively coupled to satellite modem 308 and/or communications modems 314 via a network. For example, satellite modem 308 and/or communications modems 314 can be operatively coupled to the Internet, and DIS 300 can be accessible via the Internet. Thus, DIS 300 can be deployed and powered on (or activated), and a remote operator can control DIS 300.

Operations commands can include various control and/or configuration commands or signals. In some embodiments, a command can be a signal that includes a particular type of class of information. In some embodiments, a command can be a signal that includes multiple instructions. In some embodiments, a command can be a signal, and a DIS can execute or perform some action in response to the signal. For example, operations commands or signals can include commands related to interrogating RF tags such as an interrogation command or signal configured to cause DIS 300 to interrogate RF tags within an interrogation zone (e.g., within a shipping container) and to send an interrogation response result or signal (e.g., data related to RF tags within the interrogation zone) via the satellite modem 308 and/or communications modems 314. An operations command or signal can also be a disable command or signal configured to cause DIS 300 to issue a disable or kill command or signal to RF tags within an interrogation zone. An operations command or signal can be a data access command or signal. For example, DIS 300 can periodically interrogate RF tags within an interrogation zone and can record at a memory (not shown) interrogation responses from the RF tags in the interrogation zone. A remote operator can send a data access command to DIS 300 to access or retrieve the interrogation responses stored at the memory. For example, DIS 300 can send an inventory (e.g., identifiers and/or quantities) of RF tags (or objects to which the RF tags are coupled) to a remote operator via satellite modem 308 and/or communications modems 314 in response to a data access command.

In some embodiments, communications between a remote operator and DIS 300 can be encrypted, for example, to prevent unauthorized access to the data included in the communications. In some embodiments, the remote operator authenticates with DIS 300 or DIS 300 will not respond to or refuse to execute operations commands sent to DIS 300. For example, the remote operator can authenticate with DIS 300 using a credential such as a pass code, digital certificate, encryption key and/or other authentication methods. For example, a remote operator can send a credential to DIS 300 via satellite modem 308 and/or communications modems 314. The remote user can be authenticated with DIS 300 if the credential is authorized to access DIS 300 and/or provide operations commands or signals to DIS 300.

In some embodiments, a remote user can send configuration commands to DIS 300 via satellite modem 308 and/or communications modems 314. For example, interrogator 312 and radiator 309 can be configured manually rather than automatically by system software executing at processor 311. The remote operator can send configuration commands or signals to DIS 300 via satellite modem 308 and/or communications modems 314 to configure interrogator 312 and radiator 309. For example, the remote operator can send a configuration file and/or modify parameters of the system software to configure interrogator 312 and radiator 309.

In some embodiments, DIS 300 can include an image and/or video capture device (not shown) such as a camera. The image and/or video capture device can be operatively coupled to processor 311 and can be used, for example, to record access to an enclosure in which DIS 300 is deployed or installed. For example, processor 311 can detect via system trigger 305 when a door of an enclosure is opened, and can record one or more images or videos when the door is opened. In some embodiments, other sensors can be used to trigger image and/or video capture. For example, sensors 310 can include light, temperature, and/or oxygen sensors that can trigger image and/or video capture within an enclosure when a change in oxygen, temperature, and/or light is detected. In some embodiments, images and/or video can be stored at a memory (not shown) of DIS 300 and accessed at a later time via a data interface (not shown) of DIS 300. In some embodiments, images and/or video can be sent to a remote computing device and/or data storage repository via satellite modem 308 and/or communications modems 314. In some embodiments, images and/or video can be date and/or time stamped. In some embodiments, an image and/or video capture device can include illumination elements such as lights or infrared light emitting diodes ("LEDs") to enable image and video capture in low-light conditions. In some embodiments, an image and/or video capture device can include a night vision module to enable image and video capture in low-light conditions.

Figure 4:
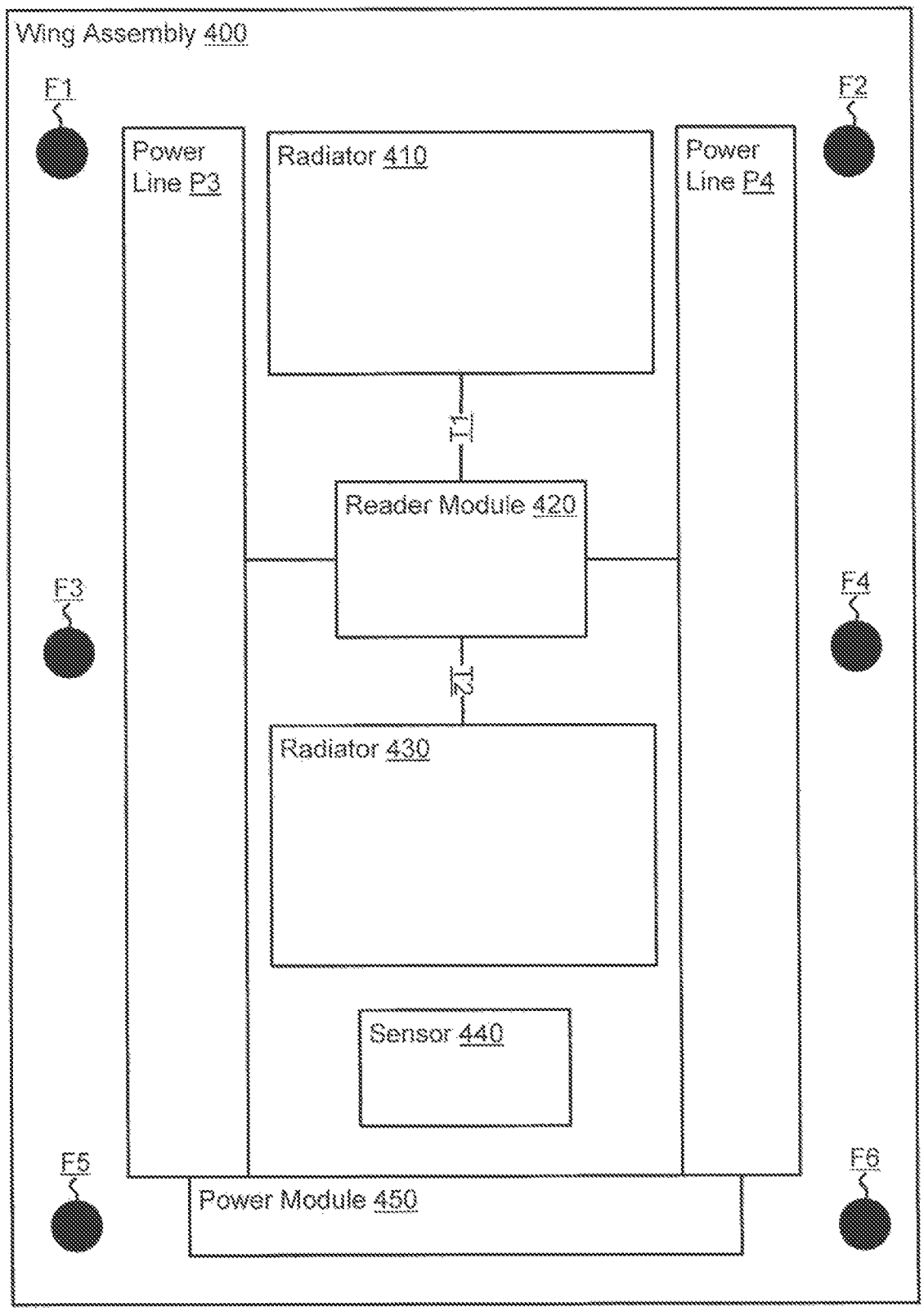
FIG. 4 illustrates one embodiment of a wing assembly, according to an embodiment.

FIG. 4 illustrates one embodiment of a wing assembly configuration, according to an embodiment. Wing assembly 400 includes reader (or interrogation) module 420, radiators 410 and 430, sensor 440, power module 450, power lines P4 and P5, and coupling devices F1, F2, F3, F4, F5 and F6. As illustrated in FIG. 4, reader module 420 is located at wing assembly 400 rather than at a main body assembly (also referred to as a "control assembly") as illustrated in FIG. 3. Thus, some components of a DIS can be moved from a control assembly to one or more wing assemblies (or disposed at one or more wing assemblies rather than at the control assembly). Reader module 420 is operatively coupled to radiators 410 and 430 via transmission lines T1 and T2, respectively. Reader module 420 is configured to be operatively coupled to a control assembly (e.g., via a wireless communication link or connection, a wired communication such as ruggedized transmission line 307 illustrated in FIG. 3, or some other wired or cabled method including a network cable such as a CAT-5, CAT-5e, CAT-6, or fiber optic cable), receive an interrogation signal from the control assembly, and interrogate one or more RF tags via radiators 410 and 430 in response to the interrogation signal. In some embodiments, a wing assembly includes a single radiator. In other embodiments, a wing assembly can include more than two radiators.

Wing assembly 400 includes power module 450 operatively coupled to power lines P3 and P4. Power module 450 can be, for example, one or more batteries and a power, voltage and/or current regulation circuit(s). In some embodiments, power module 450 includes battery charging circuitry. In some embodiments, power module 450 is operatively coupled to a control assembly and includes voltage or current regulation circuitry configured to provide an appropriate voltage, current and/or power signal to reader module 420 via power lines P3 and/or P4.

As illustrated in FIG. 4, wing assembly 400 includes coupling devices (or elements) F1, F2, F3, F4, F5 and F6. Coupling devices F1, F2, F3, F4, F5 and F6 can be magnets, latches, adhesives, rivets, and/or other coupling devices configured to couple wing assembly 400 to a surface of an enclosure. Coupling devices can also be referred to as attachment devices. For example, coupling devices F1, F2, F3, F4, F5 and F6 can be magnets configured to removably couple wing assembly 400 to an inside surface of a shipping container. The magnets can be sufficiently strong to secure wing assembly 400 to the inside surface of the shipping container, but can be separated from the surface of the shipping container by a user. In some embodiments, wing assembly 400 can be permanently coupled to an enclosure via coupling devices F1, F2, F3, F4, F5 and F6. The number of coupling device can be more or less than shown based on end product needs such as, for example, product weight, shipping conditions, and/or environmental conditions, and characteristics of the coupling device (e.g., strength of an adhesive or magnetic field generated at a magnet).

Additionally, wing assembly 400 can include sensor 440. Sensor 440 can be operatively coupled to a control assembly (e.g., directly or via reader module 420). Sensor 440 can be, for example, a door status sensor, an electromagnetic radiation sensor, a vibration sensor, a temperature sensor, a pressure sensor, and/or other sensors. In some embodiments, more than one sensor can be implemented simultaneously.

Figure 5:
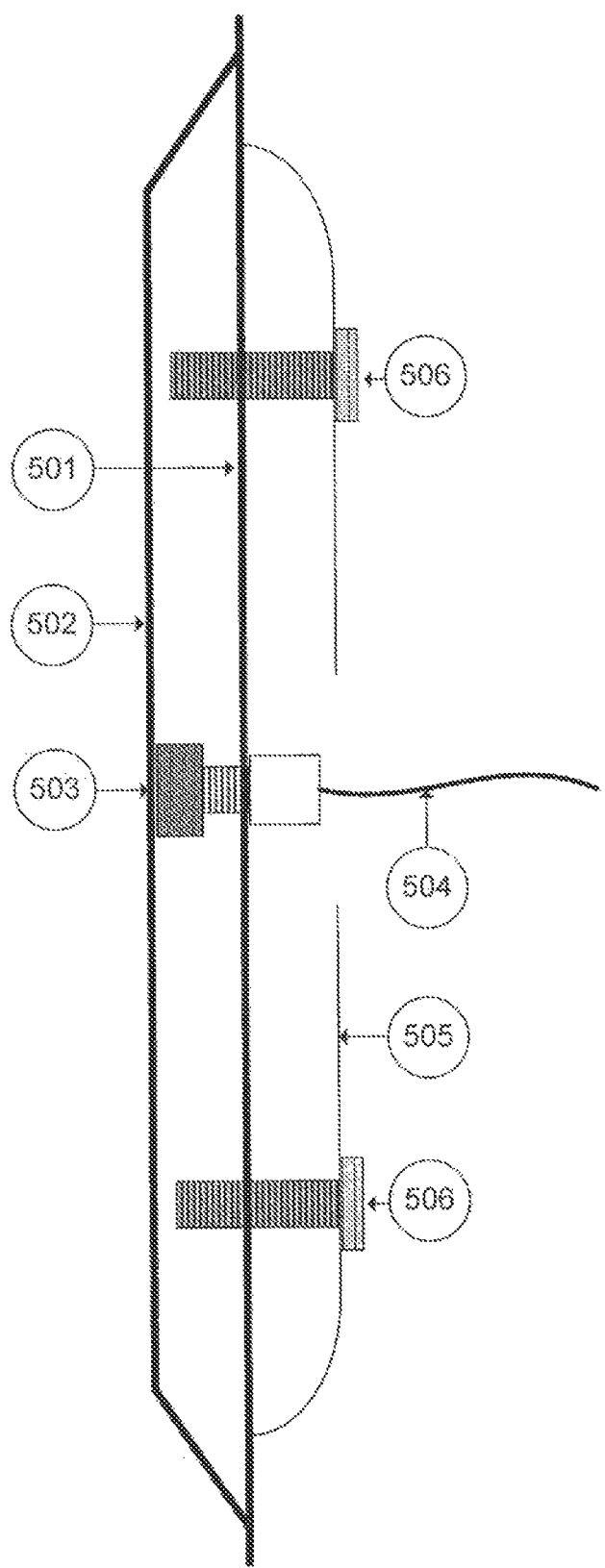
FIG. 5 is a top-down transparent view of an attach/release wing connection, according to an embodiment.

FIG. 5 is a top-down transparent view of an attach/release wing connection, according to an embodiment. As shown in FIG. 5, the attach/release wing connection includes a ruggedized transmission line 504, which terminates behind a wing substrate 501, with an RF connector 503, that can be quickly disconnected using the fasteners 506. Releasing the flange 505 exposes RF connector 503 at the end of the ruggedized transmission line 504, which can be removed without the use of any tools or specialized skill. As shown in FIG. 5, the wing includes transmission line 504 with RF connector 503 and mounting flange 505.

The DIS can be configured to facilitate cost effective disposability of the wing assembly by reducing the costs of the materials of the finished product to the point that it is more efficient to exchange units than to attempt repairs. In some embodiments, the unit can be designed for rapid replacement by removing a securing mechanism (e.g., a coupling mechanism) and removing the connecting coaxial cable connector from the mated mounted wing coaxial connector, then attaching the coaxial cable connector to the replacement wing and then attaching the securing mechanism, which protects the cable and provides additional support to the wing. The enclosed antenna can be configured to substantially reduce manufacturing costs while maintaining desired electrical characteristics. In some embodiments, the wing housing is manufactured from materials such as Acrylonitrile Butadiene Styrene (ABS) plastic commonly found in multiple industries. A slave wing can comprise one or more antennas, transmission line, RF connector, housing, and/or securing mechanisms allowing for low manufacturing costs, allowing for disposability or recycling of this assembly.

In some embodiments, the DIS can be configured with a low profile to substantially reduce the impact of the DIS on the amount of space needed within the enclosure. In other words, DIS can be designed with a low profile so that the DIS may not be an obstruction within an enclosure and reduce the space within the original enclosure prior to the deployment (e.g., installation) of the DIS.

Figure 6A:
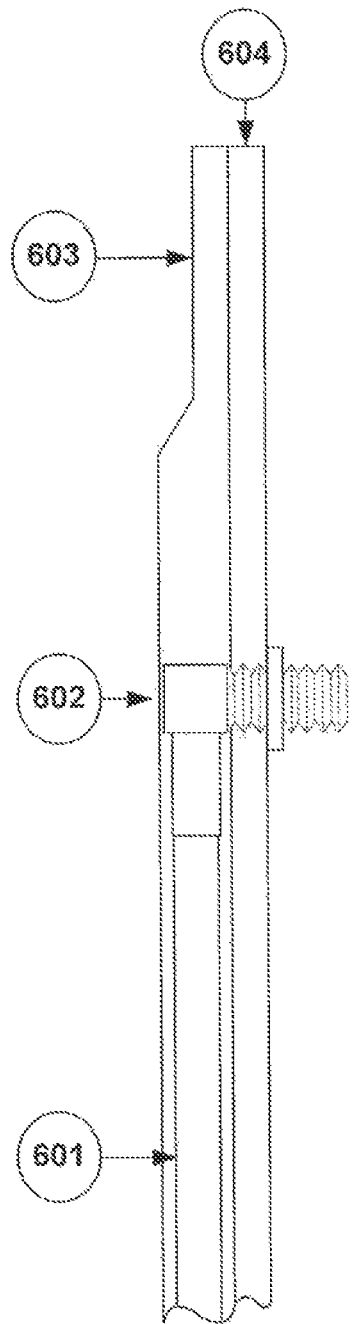
FIG. 6A illustrates an upper portion of a low-profile wing assembly.
Figure 6B:
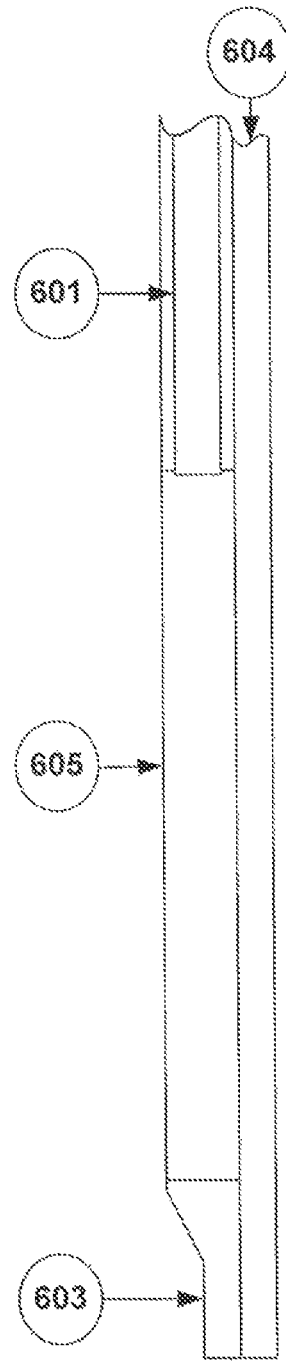
FIG. 6B illustrates portions of the low-profile wing assembly, according to an embodiment.

FIG. 6A illustrates an upper portion of a low-profile wing assembly, and FIG. 6B illustrates portions of the low-profile wing assembly, according to an embodiment. FIGS. 6A and 6B illustrate how wing assembly construction is designed to minimize overall thickness, while maintaining electrical characteristics desirable to ensure proper system performance in the designated operating frequency range. This minimized thickness is maintained throughout the unit because of an electrical connection launched from the side of the radiator/receptor (or antenna) 605 and attached to a specialized RF coaxial connector 602 secured to the substrate material via transmission line 601. These components are enclosed (or substantially enclosed) between backplane molding 603 and face substrate 604. Backplane molding 603 is configured to be adjacent to a surface of an enclosure to which the wing assembly illustrated in FIGS. 6A and 6B is coupled. For example, backplane molding 603 can include coupling devices or elements configured to couple the wing assembly to the surface of the enclosure. Face substrate 604 is configured to allow RF interrogation signals from antenna 605 to propagate through face substrate 604 to RF tags, and RF interrogation responses from RF tags to propagate through face substrate 604 to antenna 605.

In some embodiments, a variety of attachment devices may be coupled to the interior surface of the enclosure within which an RFID portal system (such as a DIS with the low-profile wing illustrated in FIGS. 6A and 6B) can function. This coupling method can be accomplished through the use of low-profile neodymium-iron-boron rare earth magnets attached to the wing substrate using rivets attached with a specialized rivet press where the enclosure is constructed of a magnetic material. Magnetic fasteners also can be used to attach a main body of the RFID portal system to the surface of the enclosure. The use of a rivet press and specially modified rivet-clincher with precise control over rivet compression can be advantageous due to the brittle nature of the neodymium-iron-boron rare earth magnets. The clincher can be modified from its standard shape by removal of outer lip on the tip of the tool. The lip can be removed to cause the resulting shape of the rivet compressed by the modified clincher, to be flatter than a rivet compressed by a standard clincher, thereby allowing it to fit within a countersunk hole in the magnet.

In some embodiments, the method of attachment is as follows: a hole with the same size diameter as the rivet can be drilled through the wing substrate. A rivet can then be placed through the hole with the head on the opposite side of the substrate from the side which will be coupled to the enclosure surface. A neodymium-iron-boron rare earth magnet with countersunk hole can be placed over the shaft of the rivet on the side of the substrate which can be coupled to the enclosure surface with the countersunk hole facing opposite the direction of the rivet head. The rivet can be compressed using a modified rivet clincher in a press. The rivet can be compressed to a precise length determined by the size of the magnet.

Figure 7:
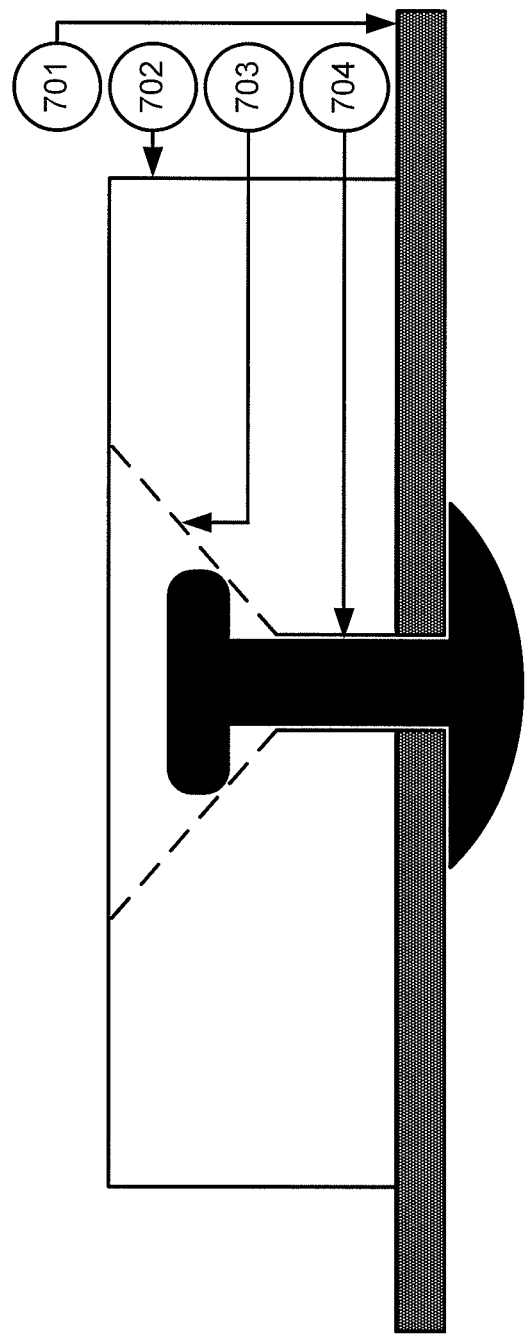
FIG. 7 illustrates a cross-sectional view of an attachment device, according to an embodiment.

FIG. 7 illustrates a cross sectional view of an attachment device, according to an embodiment. FIG. 7 illustrates a wing substrate 701 (such as backplane molding 603 illustrated in FIGS. 6A and 6B), a magnet 702, a countersunk hole 703, and a rivet 704. In some embodiments, the attachment assembly shown in FIG. 7 can be used to attach one or more neodymium-iron-boron rare earth magnet(s) to wing assemblies. One type of magnet that works effectively has a countersunk hole to facilitate flat attachment to the enclosure wall.

Figure 8:
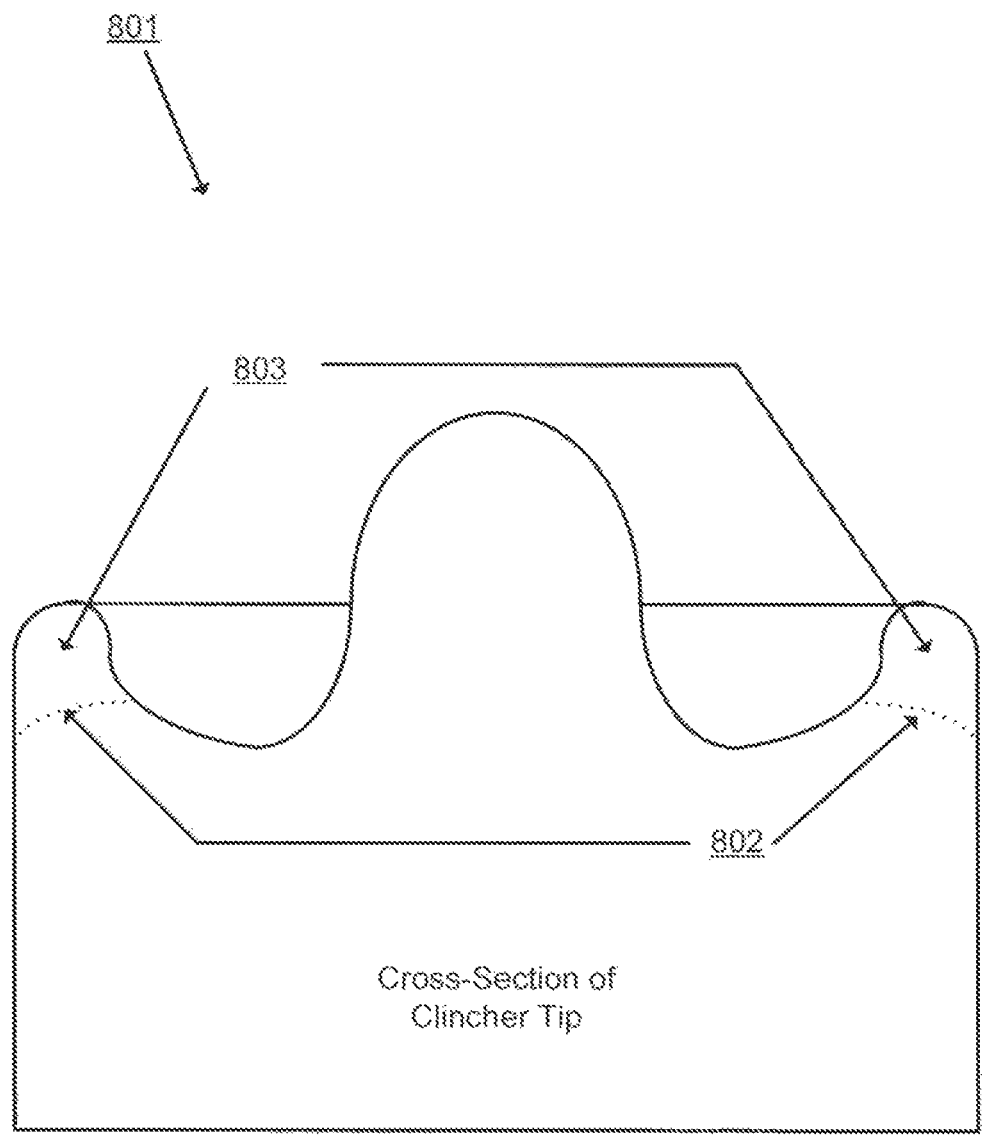
FIG. 8 is a schematic diagram that illustrates a cross-sectional view a modification to a rivet clincher, according to an embodiment.

FIG. 8 is a schematic diagram that illustrates a cross-sectional view of a modification to a rivet clincher, according to an embodiment. The modification to rivet clincher 801 can better fasten neodymium-iron-boron rare earth magnets (e.g., magnet 702 illustrated in FIG. 7) to wing assemblies. The diagram depicts a cross-sectional view of a modification to the tip of a standard rivet clincher 801. The dotted line 802 within the shape represents the outer edge of the material after the lip of the clincher tip 803 has been removed to modify the standard rivet clincher 801. While a standard clincher compresses the end of the rivet all the way back in the direction of the head of the rivet but cracks the magnet in the process, the modified clincher doesn't bend the rivet as far, allowing a snug fit without cracking a magnet (e.g., magnet 702 illustrated in FIG. 7). The rivet is also compressed into the countersunk hole in the magnet so as not to interfere with attaching the final assembly to a flat surface.

Figure 9:
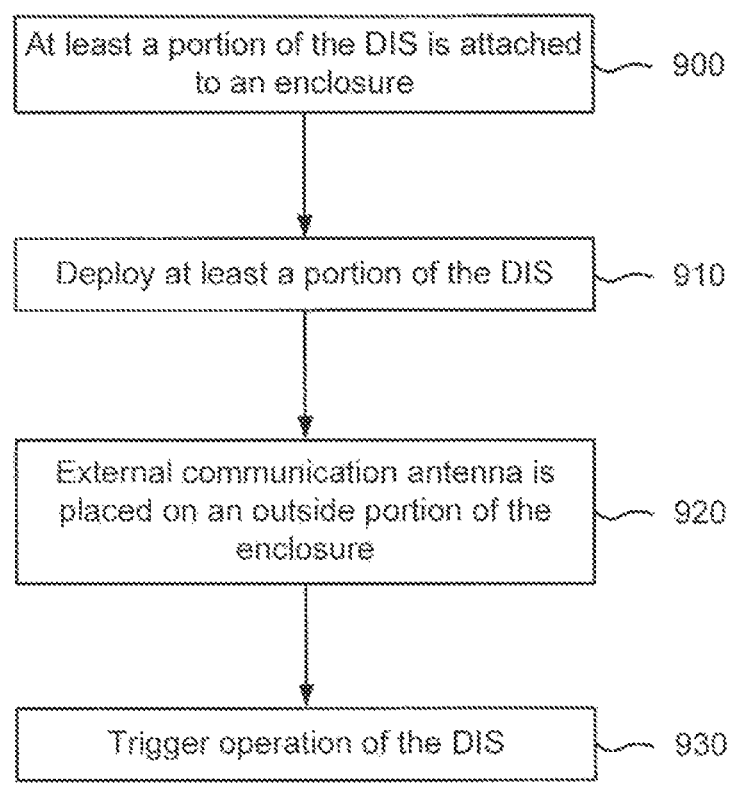
FIG. 9 is a flowchart that illustrates a method for installing a DIS in at least a portion of an enclosure, according to an embodiment.

FIG. 9 is a flowchart that illustrates a method for installing a DIS in at least a portion of an enclosure, according to an embodiment. As shown in FIG. 9, at least a portion of the DIS is attached to a portion of an enclosure at 900. In some embodiments, a portion of the DIS (e.g., wing, body) can be attached to an interior portion of an enclosure (e.g., a shipping container, a box, vending machine, server rack, etc.). In some embodiments, the body or a portion of a component attached to the body can be placed in contact with the inside roof of the enclosure when being attached.

In some embodiments, the body can be attached by magnetic coupling or other attachment device (e.g., a screw, a rivet, latch, Velcro, etc.) depending on the material composition of the enclosure. For example, to retrofit a plywood lined semi-trailer, screws could be used to mount the body to the interior of the trailer. For attaching the body to non-magnetic enclosures, such as aluminum, common fasteners including but not limited to screws, double sided tape, or industrial strength suction cups can be used to affix the body to the interior of the enclosure.

At least a portion of the DIS is deployed at 910. In some embodiments, elastic straps used to stow one or more wings are detached one at a time (or at the same time). After one wing is detached, the wing can be placed on, for example, a wall (e.g., vertical wall) near the side of the body to which the wing is attached. In some embodiments, the wing can be automatically attached to the wall through magnetic coupling and/or other attachment component (also can be referred to as a coupling component), for example, depending on the material composition of the enclosure. The wing can be attached using components and/or methods similar or different than those used to attach the body to the enclosure.

In some embodiments, if a wing of a DIS is attached to a portion of an enclosure before another portion of the DIS is attached to a portion of the enclosure, the body can be deployed. In other words, the body can be deployed from the wing of the DIS. When one or more wings are deployed from the body, the DIS can be in a deployed state.

In some embodiments, if the DIS includes two wings, multiple attachment components can be used to stow each of the two wings when the DIS is in an undeployed state. For example, a first strap (or second set of straps) can be detached to deploy the first wing, and a second strap (or second set of straps) can be detached to deploy the second wing. In some embodiments, the straps can be elastic straps. In some embodiments, the second wing can be placed on a wall opposite the wall that the first wing is attached. The first wing and/or second wing can be configured to attach to the wall through magnetic coupling and/or different attachment component, for example, depending on the material composition of the enclosure. In some embodiments, the first wing and the second wing can be placed on the same wall. In some embodiments, the first wing, the second wing, and/or the body can be placed on different portions of the enclosure (e.g., floor, ceiling, walls, support beam, door, etc.)

An external communication antenna is placed on an outside portion of the enclosure at 920. The outside portion can be, for example, an outside portion or surface of a door, a top, side, and/or bottom portion of the enclosure. In some embodiments, the external communication antenna can be associated with a bundle of external communications antennas. In some embodiments, the external communication antenna can be placed on the outside portion of the enclosure through magnetic coupling and/or a different attachment component, for example, depending on the material composition of the enclosure. In other words, the communication antenna can be attached to the enclosure using components and/or methods similar to those described in connection with the body and/or wing. In some embodiments, the external communication antenna can be disposed such that the external communication antenna is partially within an enclosure and partially without the enclosure. That is, the external communication antenna can be neither entirely within or entirely without the enclosure. In some embodiments, where the enclosure allows the passage of electromagnetic radiation (e.g., RF energy or waves) through material or materials comprising the sides of the enclosure, the external communication antenna or system can reside completely within the enclosure.

In some embodiments, the external communication antenna can be connected to the body through a coaxial cabling system (e.g., a low profile coaxial cabling system and/or a ruggedized coaxial cabling system) via, for example, a door seal. The coaxial cabling system can be a ribbon cable having a disconnect terminator on one end that attaches to the body and having RF connectors on another end that to attaches to the external communication antenna(s). To a desirable extent, antennas can be used to interface with more than one communication modems to reduce the number of antennas on the outside of the enclosure.

Operation of the DIS can be triggered at 930. In some embodiments, once one or more portions of the DIS are physically installed (e.g., body attached, wing attached), the DIS can be brought online (e.g., powered-up) through one of a variety of wireless communications systems including satellite, cellular, Wi-Fi and mesh networking technology. In some embodiments, the DIS can be automatically triggered to operate in response to being attached to an enclosure. In some embodiments, the DIS system can be configured to automatically sense the status of the door. In some embodiments, the DIS system can be configured to automatically inventory in response to the door being closed. For example, when the door is closed, the system automatically launches an interrogation cycle using one or more interrogation radiators/receptors (or antennas), the number of which depends on the dimensions of the enclosure and the expected difficulty associated with reading the tags. More details regarding triggering of interrogation are set forth in the commonly owned U.S. Pat. No. 7,256,682, "Remote Identification of Container Contents by Means of Multiple Radio-frequency Identification Systems," the disclosure of which is incorporated herein by reference in its entirety. In some embodiments, a DIS can be configured to automatically detect changes on the inside of the enclosure (e.g., light levels, air pressure, movement, etc.) and trigger an appropriate (e.g., programmed or based on a particular change or combination of changes) action such as, for example, start an inventory or interrogation process or cycle, notify outside or remote personnel (e.g., a remote operator) or systems, activate recording devices (e.g., image and/or audio capture devices), and/or trigger a visual or audible alarm.

A DIS can interrogate RFID modules by receiving a trigger or interrogation command or signal at a processor or processor module. The processor can receive the interrogation command and send an interrogate command to an RFID reader or interrogator. The RFID reader can then generate an RF signal that is transmitted (e.g., via a transmission line) to a radiator or antenna. The RF signal is configured to radiate RFID modules such that the RFID modules respond (e.g., transmit an interrogation response) to the RF signal. The RFID reader can receive the interrogation response via the antenna, and send that interrogation response (or data related to that interrogation response) to the processor module. In some embodiments, the interrogation response can include data related to an object to which the RFID module is attached. In some embodiments, the interrogation response can include data related to an RFID module identifier such as a unique identifier of an RFID module or a class of RFID modules.

Once the data (e.g., inventory related information) is received (e.g., captured) by the DIS, the data can either be forwarded (e.g., forwarded immediately) to a centralized storage repository, or stored on-board the enclosure to be forwarded at a later time in batch. The data can be accessed either directly on the physical system described above or in a centralized repository or both. In some embodiments, the DIS can be configured to only forward information (and/or permit interrogation) when the DIS is in an undeployed state. In some embodiments, the DIS can be configured to only forward information (and/or permit interrogation) when the DIS is in a deployed state. In some embodiments, the DIS can be configured to forward information (and/or permit interrogation) and/or change to a forwarding state when the DIS changes from a deployed state to an undeployed state, and vice versa. In some embodiments, the portions of the flowchart can be performed in a different order and/or include more or fewer steps than illustrated in FIG. 9. For example, data may be captured before the DIS is fully deployed within an enclosure.

In some embodiments, all or substantially all required hardware for an RFID system (or portal) can be fully encased in a single DIS unit including the RFID interrogator, central processing unit, power supply, external communications capabilities and more making the installation and removal process easier to handle or simpler. In some embodiments, the DIS can be installed in a matter of minutes. In some embodiments, the DIS can provide total asset visibility down to the unit level and automatically update inventory level(s) when tagged assets are placed in or removed from the enclosure. In some embodiments, the attachment components (e.g., magnetic system) require in the enclosure no holes for mounting purposes, which maintains the environmental and mechanical integrity of the enclosure. In some embodiments, the enclosure opening/closing sensor (e.g., switch) and external communications antennas can be installed in a single step. In some embodiments, the wing and body hardware can be low profile (e.g., fractions of an inch), thereby minimizing the risk of direct impact and the amount of cubic space consumed by the DIS. In some embodiments, the wing infrastructure can be designed to be disposable thereby minimizing maintenance expense.

In some embodiments, the interrogation zones are defined by the placement of a DIS body that contains an interrogator and antennas, in addition to the placement of master and/or slave wings (e.g., mounted on ceiling, walls, and/or door). These zones may be further defined through embedded software and/or hardware to provide multiple zones within the overall coverage area.

Figure 10:
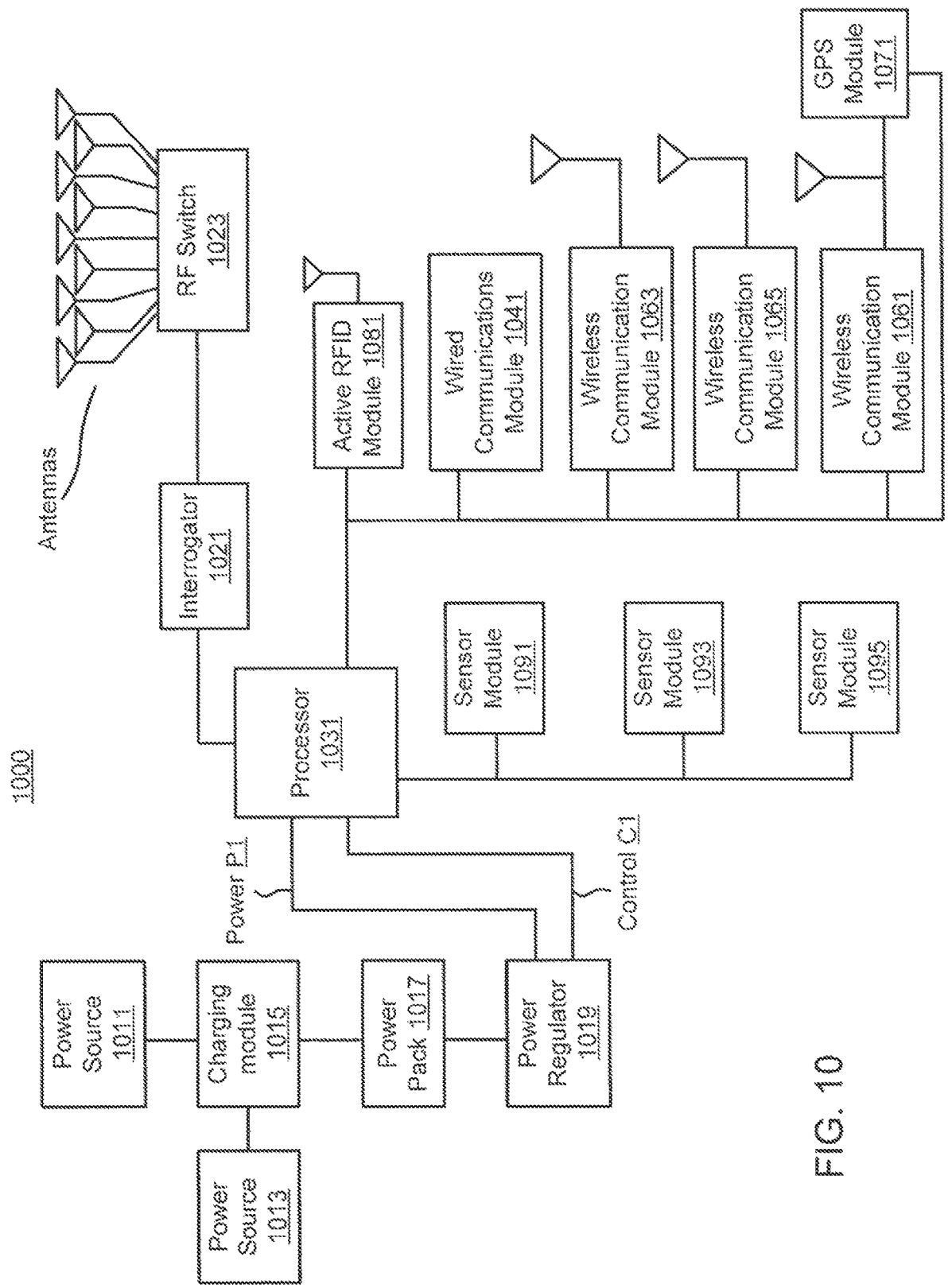
FIG. 10 is a schematic diagram of at least some connections within a DIS, according to an embodiment.

FIG. 10 is a schematic diagram of at least some electrical connections within a DIS, according to an embodiment. In some embodiments of the DIS, the body contains an interrogator (or RFID reader) capable of exchanging RF energy with wing assemblies through a radio-frequency switch (or RF switch). The wing assemblies have one or more radiators and may not include any interrogators installed or disposed within. The RF switch can contain one or more inputs and one or more outputs to route RF energy from the interrogator through to each of the installed slave wing assemblies in a prescribed order as dictated by the needs and requests of the end user, thus providing efficient use of a single interrogator with multiple antennas. Multiple antennas can provide improved performance across larger areas, increasing the ability to interrogate RF tags in range.

In some embodiments, DIS 1000 includes power components, a processor, sensor modules, a RFID interrogator and antennas, an active RFID module, communications modules, and a GPS module. The power components of DIS 1000 include power source 1011, power source 1013, a charging module 1015, power pack 1017, and power regulator 1019. Power sources 1011 and 1013 can be separate and/or independent power sources, and can also provide power directly to power regulator 1019. Power sources 1011 and/or 1013 can be, for example, a solar panel, an connection to an electric grid, a power-over-Ethernet (or "PoE") module, and or some other power source or power harvesting device, component, or system. Charging module 1015 can be mechanical and/or electrical elements configured to charge power pack 1017 by using power or energy supplied by power source 1011 and/or power source 1013. Power pack 1017 can include batteries, capacitors, and/or other electrical energy storage components. For example, power pack 1017 can include lithium polymer, lithium ion, nickel metal hydride (or "NiMH"), nickel cadmium (or "NiCd"), and/or other battery cells. Power regulator 1019 can provide one or more power lines to provide electrical power to various components of DIS 1000. For example, power regulator 1019 can receive one input voltage level from power pack 1017, and can provide multiple voltage levels to various components of DIS 1000.

As illustrated in FIG. 10, power line P1 is provided from power regulator 1019 to processor 1031. Although not illustrated in FIG. 10, additional power lines (with various voltage levels) can be provided by power regulator 1019 to processor 1031 and/or other components of DIS 1000. Additionally, power regulator 1019 can receive control signals or commands from processor 1031 via control line C1. Power regulator 1031 can, for example, disable a power line or change a voltage level in response to a signal or command from processor 1031. For example, processor 1031 can disable one or more of sensor modules 1091, 1093, 1095, and/or additional sensors not shown in FIG. 10 by sending a control signal or command to power regulator 1019 to disable power to that sensor module(s).

In some embodiments, processor 1031 is operatively coupled to sensor modules 1091, 1093, and 1095, active RFID module 1081, wired communications module 1041, wireless communications modules 1061, 1063 and 1065, global positioning system ("GPS") module 1071, and interrogator 1021. Interrogator 1021 is operatively coupled to a number of antennas via RF switch 1023. In some embodiments, processor 1031 is also operatively coupled to RF switch 1023, for example, to switch between the various antennas operatively coupled to interrogator 1021 via RF switch 1023.

In some embodiments, processor 1031 can interrogate RF tags (or RFID modules) within an interrogation zone such as a shipping container or other enclosure via interrogator 1021 and RF switch 1023. For example, processor 1031 can send an interrogation command (or signal) to interrogator 1021, and interrogator 1021 can send one or more interrogation signals (or commands) through the antennas operatively coupled to RF switch 1023 to interrogate RFID modules. In some embodiments, interrogator 1021 can configure RF switch 1023 to radiate a first interrogation signal through a first subset of the antennas, and a second interrogation signal through a second subset of antennas in response to an interrogation command from processor 1031. In some embodiments, the antennas are operatively coupled to a group of wing assemblies distributed throughout an enclosure. Interrogator 1021 can receive interrogation responses from the RFID module via the antennas, and send the interrogation responses to processor 1031. Processor 1031 can store the interrogation responses at a memory (not shown in FIG. 10) operatively coupled to processor 1031 and/or send an interrogation result to a computing device or storage repository (not shown in FIG. 10) via one or more of wireless communication modules 1061, 1063, and 1065. An interrogation result can include, for example, a summary or inventory of RFID modules that responded to an interrogation signal (e.g., provided an interrogation response after receiving an interrogation signal), data from one or more of sensor modules 1091, 1093 and 1095, one or more geographic location coordinates, and/or interrogation responses.

In some embodiments, processor 1031 can determine a position of an RFID module within an enclosure based on interrogation responses. For example, the antennas operatively coupled to RF switch 1023 can be attached at positions within the enclosure that are provided to processor 1031. In other words, processor 1031 can be aware of the relative positions of the antennas within the enclosure. Processor 1031 can send an interrogation command (or signal) to interrogator 1021, and interrogator 1021 can provide a number of interrogation signals (or commands) to the antennas via RF switch 1023. For example, interrogator 1021 can select one antenna (or a subset of antennas) at RF switch 1023 can provide an interrogation signal (or command) to that antenna. The RFID modules within the enclosure can respond to the interrogation signal (or command), and interrogator 1021 can provide various parameters to processor 1031 related to the interrogation responses. For example, interrogator 1021 can provide an identifier of the antenna (or antennas) used to interrogate the RFID module, the time before the interrogation response was received from each RFID module, and/or a signal strength of the interrogation response received from each RFID module. This can be repeated for each antenna (or subset of antennas). After processor 1031 has received the parameters related to the interrogation responses received at each antenna (or subset of antennas), the processor can calculate or triangulate a position of one or more RFID modules within the enclosure based on the position of each antenna and the parameters received from interrogator 1021.

In some embodiments, interrogation responses can include an identifier of the RFID module sending the interrogation response, and that identifier can be associated with or related to a particular object. For example, an RFID module with a particular identifier can be attached to a container such as a box including books. Processor 1031 can access a database (such as a relational database) at a memory (not shown) or via one or more of wireless communication modules 1061, 1063, and 1065 to relate the identifier to information about the contents of the container. Thus, processor 1031 can determine whether a particular article, device, or object is located within an enclosure, and where in the enclosure the article, device, or object is located.

As discussed above, processor 1031 can communicate with a remote computing device via one or more of wireless communication modules 1061, 1063, and 1065. Processor 1031 can additionally receive data via sensor module 1091, 1093, and/or 1095 and transmit the sensor data via one or more of wireless communication modules 1061, 1063, and 1065. In some embodiments, DIS 1000 can be operatively coupled or in communication with one or more other DISs via one or more of wireless communication modules 1061, 1063, and 1065. Additionally, processor 1031 can be in communication with computing devices and/or other DISs via wired communications module 1041. For example, wired communication module 1041 can be an Ethernet module (such as a network interface card or "NIC") and DIS 1000 can communicate with other DISs or a computing device via the Ethernet module. In some embodiments, power source 1011 or power source 1013 can be a PoE module and can also be coupled to the Ethernet module and can receive power via an Ethernet cable.

In some embodiments, one or more of wireless communication modules 1061, 1063, and 1065 can share an antenna with GPS module 1071. In other embodiments, GPS module 1071 does not share an antenna. Processor 1031 can communicate with GPS module 1071 to determine a geographic location of DIS 1000. In some embodiments, processor 1031 can receive a geographic location via GPS module 1071 and determine whether DIS 1000 is within a predefined geographic region. The predefined geographic region can be referred to as a virtual yard, and processor 1031 can take various actions in response to the geographic location or position of DIS 1000 relative to the virtual yard. For example, processor 1031 can determine that DIS 1000 is within the virtual yard, and can interrogate RFID modules and store or send via one or more of wireless communication modules 1061, 1063, and 1065 an inventory of objects in a container based on the determination that DIS 1000 is within the virtual yard. In some embodiments, processor 1031 can delete data stored at DIS 1000 if processor 1031 determines that DIS 1000 is not within the virtual yard. In some embodiments, processor 1031 can destroy a portion of DIS 1000 (e.g., delete data and apply a destructive voltage to electrical components) if processor 1031 determines that DIS 1000 is not within the virtual yard. In other words, processor 1031 can issue a destruct command to a portion of DIS 1000. In some embodiments, processor 1031 can issue a destruct command to a processor module including processor 1031 such that processor 1031 self-destructs. In some embodiments, data can be uploaded to a storage repository via one or more of wireless communication modules 1061, 1063, and 1065 or wired communications module 1041 before DIS 1000 is destroyed.

Figure 16:
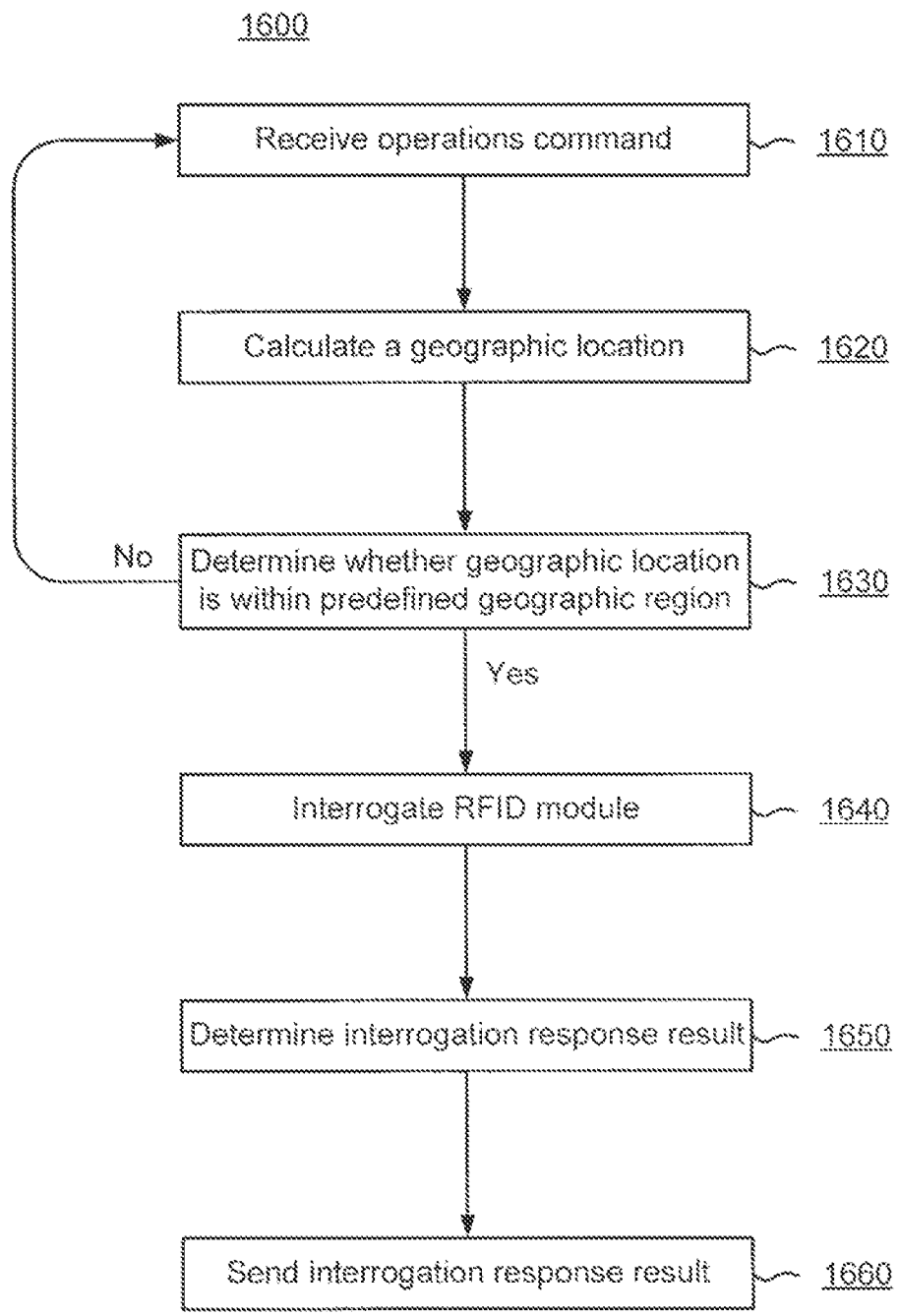
FIG. 16 is a flowchart of a process for interrogating an RFID module with a DIS, according to an embodiment.

For example, FIG. 16 is a flowchart of process 1600 for interrogating an RFID module with a DIS, according to an embodiment. An operations command or signal such as an interrogation command or signal can be received at a DIS, at 1610. An operations command or signal can also be, for example, a data access command or signal, or a configuration command or signal. Before processing the operations command received at 1610, a DIS can calculate or determine a geographic location of the DIS, at 1620. For example, a DIS can access a GPS module to determine a geographic location of the DIS. In some embodiments, a DIS can access multiple GPS modules and/or GPS correction modules (e.g., to improve precision or accuracy of geographic location information received from the GPS module) to calculate a geographic location.

The DIS can then determine whether the geographic location is within a predefined geographic region, at 1630. In some embodiments, the operations command or signal received at 1610 includes a definition of the predefined geographic region. In some embodiments, one or more predefined geographic regions are stored at a memory of the DIS. In some embodiments, the DIS can select a predefined geographic region based on a type, class, or parameter of the operations command received at 1610. If the geographic location is not within the predefined geographic region, a DIS implementing process 1600 can return to step 1610 to receive other operations commands or signals. In other words, the DIS can determine that the operations command initially received at 1610 should not be executed because the DIS is not within a predefined geographic region.

If the geographic location calculated at 1620 is within the predefined geographic region, a DIS implementing process 1600 can interrogate one or more RFID modules, at 1640. Typically, interrogating RFID modules includes transmitting or radiating one or more interrogation signals (or commands) at one or more antennas, and receiving interrogation responses from the RFID modules via the one or more antennas. At 1650, the interrogation responses can be used to determine an interrogation response result. For example, an interrogation response result (or "interrogation result") can be determined by generating a summary at the DIS of the interrogation responses. For example, an interrogation result can include a number of RFID modules that responded to (e.g., send an interrogation response that was received by the DIS) the interrogation signals. In some embodiments, interrogation results can include other information such as, for example, a categorized listing of RFID modules, a categorized listing of objects to which the RFID modules are attached, the number of a particular object to which RFID modules are attached, and/or other information about RFID modules and/or objects to which RFID modules are attached that were interrogated by the DIS.

The interrogation response result can be sent, at 1660. For example, the interrogation response result can be sent via a satellite communications link, a wireless network communications link, a mesh network communications link, and/or via some other communications link. In some embodiments, the interrogation response result can be sent to and stored at a storage repository. In some embodiments, the interrogation response result can be sent to a computing device from which the operations command or signal received at 1610 was received, or to some other computing device. Additionally, process 1600 can include more or fewer steps than those illustrated in FIG. 1600. For example, in some embodiments, the geographic location is not calculated, but is accessed, for example, at a memory of the DIS. In some embodiments, for example, authentication information is received and verified (or validated or processed) before RFID modules are interrogated and the interrogation response result is sent. If the authentication information cannot be verified (or validated or processed), process 1600 can return to 1610.

Referring now to FIG. 10, in some embodiments, DIS 1000 can receive an operations command (or signal) via one or more of wireless communication modules 1061, 1063, and 1065 and can determine whether DIS 1000 is within a particular geographic region before executing or responding to the operations command. For example, DIS can receive an interrogation command (or signal) via one or more of wireless communication modules 1061, 1063, and 1065, and can acquire a geographic location from GPS module 1071 in response to the interrogation command (or signal). If the geographic location is within a predefined geographic region, DIS 1000 can interrogate RFID module within an interrogation zone and send an interrogation result in response to the interrogation command (or signal). If the geographic location is not within the predefined geographic region, DIS 1000 can ignore the interrogation command (or signal). In other words, DIS 1000 cannot interrogate the RFID modules within the interrogation zone because DIS 1000 is not within the predefined geographic region.

In some embodiments, an operations command can include a definition of a geographic region as parameter and DIS 1000 can respond to the operations command if DIS 1000 is within the geographic region. For example, DIS 1000 can receive an interrogation command with a geographic location and a radius. The geographic location and radius can define a geographic region of a circle with the radius centered at the geographic location. DIS 1000 can determine its geographic location, and can respond (e.g., interrogate RFID module within an interrogation zone) if its geographic location is within the radius from the geographic location included in the interrogation command. Such embodiments can be particularly beneficial in applications in which an object is to be located within a certain distance from a geographic location.

Active RFID module 1081 can transmit data or information about the contents of an enclosure outside the enclosure. For example, active RFID module 1081 can include a battery or other power element that provides active RFID module 1081 with a communications range that is greater than the communications range of an RFID module (or passive RFID module) within the enclosure. In some embodiments, active RFID module 1081 can be located outside the enclosure. Processor 1031 can interrogate the RFID modules within the enclosure via interrogator 1021, RF switch 1023 and antennas, and can upload an interrogation result to a memory within active RFID module 1081. Active RFID module 1081 can then be read or interrogated outside the enclosure.

Figure 11:
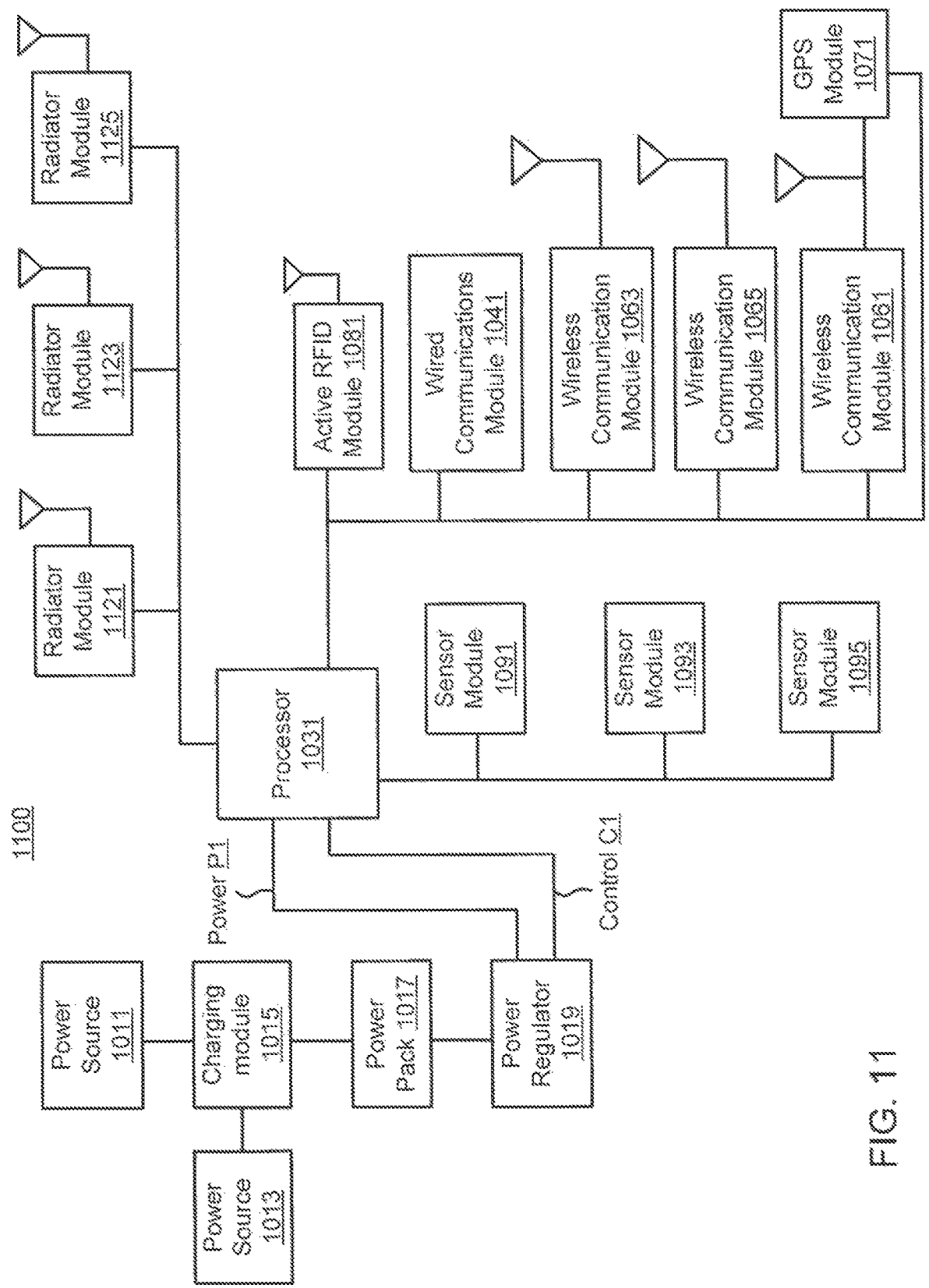
FIG. 11 is a schematic diagram of at least some connections within a DIS, according to an embodiment.

FIG. 11 is a schematic diagram of at least some connections within a DIS, according to an embodiment. In some embodiments of the DIS, an interrogator can be included or disposed into the wings assemblies of a DIS. These wings may receive power from the body via cabling, or may receive power from a self-contained power source built within the wing assembly. Wings with interrogators (also referred to as master wings) may be connected to and use wings without interrogators (also referred to as slave wings) to extend its coverage (e.g., an RF interrogation zone) and capabilities. An advantage of using this embodiment is that the lengths of coaxial cable is reduced, which also reduces the insertion loss associated with the cables, which in turn effects the transmitted signal level and the level of the received signal. Multiple antennas provide improved performance across larger areas increasing the ability to interrogate RF tags in range.

DIS 1100 includes power components, a processor, sensor modules, RFID radiator (or interrogator) modules, an active RFID module, communications modules, and a GPS module. DIS 1100 is similar to DIS 1000 illustrated in FIG. 10 and discussed above. Rather than an interrogator and RF switch coupled to multiple antennas as in DIS 1000, DIS 1100 uses radiator modules 1121, 1123 and 1125 to interrogate RFID modules. Radiator modules 1121, 1123 and 1125 can be, for example, a wing assembly including an interrogator or a wing assembly including an interrogator and a radiator. A radiator module can also be referred to as an interrogator module. Wing assembly 400 illustrated in FIG. 4 is an example of a radiator module. Each radiator module 1121, 1123 and 1125 can include an interrogator and one or more antennas, and can be mounted or attached to various surfaces within a container. In some embodiments, radiator modules can be used in combination with an interrogator and RF switch operatively coupled to multiple antennas.

In some embodiments, a processor (or processor module), radiator module and/or interrogator (or interrogator module) can be adaptive. In other words, a processor module can store at a memory information related to a number of repeated interrogation attempts and/or power levels of interrogation response and determine an appropriate power level for an interrogation signal at a particular wing assembly or antenna. For example, if a radiator module requires multiple repeated interrogation attempts to receive an interrogation response from an RFID module or if the interrogation response is received at a low power level, that radiator module can be obstructed from the RFID module or can experience interference. A processor module or interrogator module can increase the signal strength of an interrogation signal sent to that radiator module (or radiator or antenna) to determine whether the increased signal strength improves reception of interrogation responses. If the increased signal strength results in improved interrogation responses, the processor module or interrogator module can set the signal strength for that radiator module. If the increased signal strength does not improve interrogation responses, the processor can further increase the signal strength and/or can inform a user (e.g., via a communications modem or link) of an error. Additionally, a processor module and/or interrogator module can lower a signal strength for a radiator module (or radiator or antenna) to level that provides acceptable interrogation responses in order to save or economize power consumption of the DIS.

Figure 12:
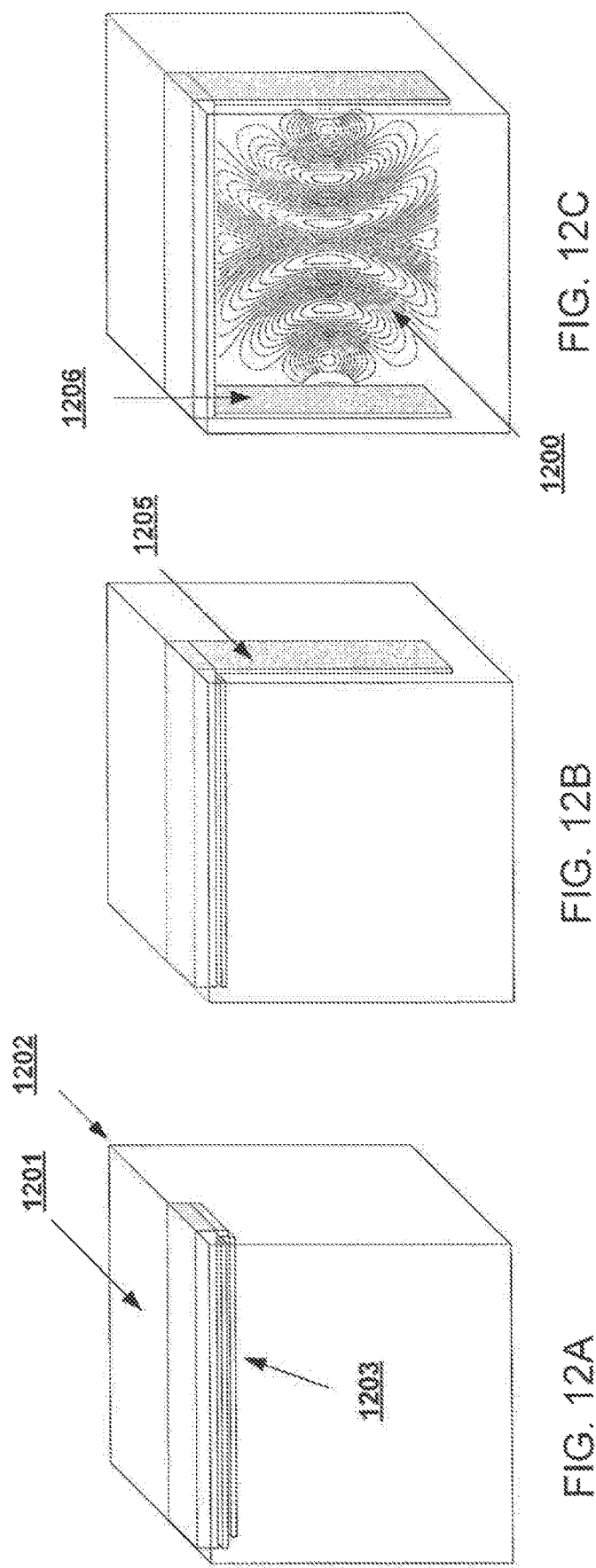
FIGS. 12A, 12B and 12C illustrate the installation of one embodiment of the DIS, according to an embodiment.

FIGS. 12A, 12B and 12C illustrate the installation of one embodiment of the DIS. FIG. 12A depicts apparatus 1203 (e.g., a DIS) as it is coupled to the ceiling 1201 of an enclosure 1202. The apparatus 1203 (e.g., DIS) has its wings folded in and held in place by quick-release fasteners (e.g., attachment devices which are not shown). FIG. 12B illustrates the first of one or more wings 1205 having been released and coupled to the enclosure wall. FIG. 12C illustrates the second wing 1206 deployed, such that both wings (1205 and 1206) are coupled to the walls. FIG. 12C also shows a representation of an electromagnetic field within a newly-defined interrogation zone 1200. In some embodiments, DIS 1203 can include additional wings. For example, in some embodiments a wing can be attached to the floor (opposite ceiling 1201) of enclosure 1202.

In some embodiments, DIS 1203 can be active as objects with attached RFID modules are loaded into enclosure 1202. DIS 1203 can interrogate each RFID module to determine whether the object to which the RFID module is attached should be in enclosure 1202. For example, each RFID module can respond to an interrogation signal from DIS 1203 with an interrogation response including an identifier of that RFID module. DIS 1203 can access a database to determine whether than RFID module (or the object to which that RFID module is attached) is authorized to be in enclosure 1202. If an RFID module (or the object to which that RFID module is attached) is loaded into the enclosure 1202 and is not authorized to be in enclosure 1202, DIS 1203 can provide an indication or alarm. For example, a light can be illuminated or an audio alarm (such as a buzzer) sounded at DIS 1203. In some embodiments, DIS 1203 can also provide an indication that an object or RFID module attached to that object is authorized to be in enclosure 1202. For example, DIS 1203 can illuminate a green light if an object is detected that is authorized to be in enclosure 1202, and a red light if an object is detected that is not authorized to be in enclosure 1202. Additionally, DIS 1203 can provide an alarm if a user fails to authenticate with DIS 1203 at a keypad or biometric security module with some limit. In some embodiments, indications and/or alarms can be transmitted to a remote computing device or storage repository via one or more of wireless communication modules 1061, 1063, and 1065, or wired communication module 1041.

Figure 13:
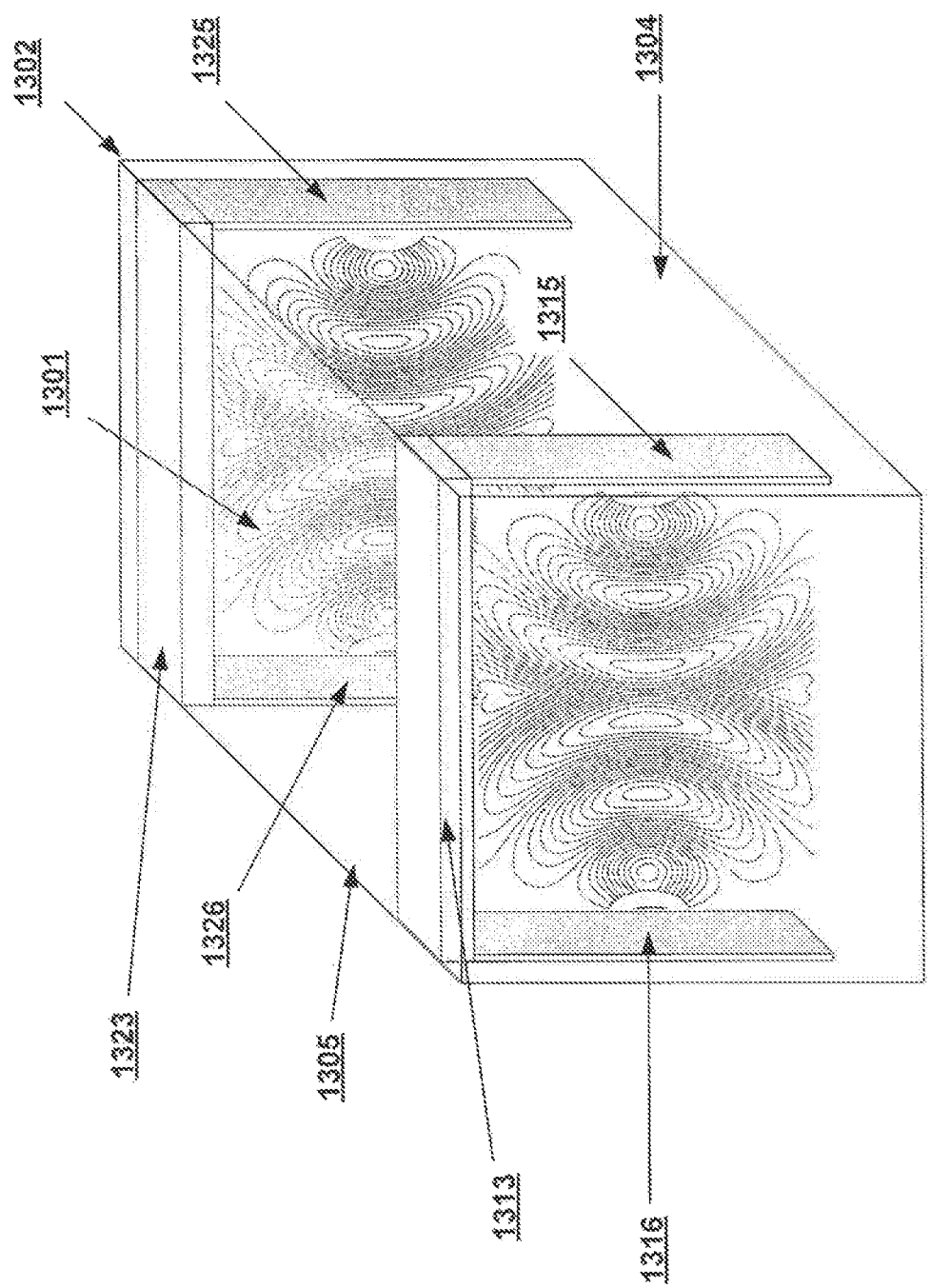
FIG. 13 illustrates the simulation of RF energy generate in one embodiment of the DIS.

FIG. 13 illustrates an embodiment of a DIS. In some embodiments of the DIS, a body unit containing an interrogator and one or more antennas, in addition to the other previously mentioned subsystems can be deployed for where master or slave wings are not present, required or necessary. This situation can include, but is not limited to, a smaller confined space, an area which does not require more significant coverage, and/or where wing assemblies are not necessary to adequately define an interrogation zone within an enclosure (e.g., where electromagnetic radiation from the antennas included in the body unit of the DIS is sufficient to define an adequate interrogation zone). In some embodiments, multiple DIS units can be configured to communicate with one another and synchronize inventory-related information.

As illustrated in FIG. 13, DIS 1313 and DIS 1323 are attached to enclosure 1302. An assembly of DIS 1313 is coupled or attached to a surface of an upper portion (or ceiling) 1301 of enclosure 1302. Wings 1315 and 1316 of DIS 1313 are attached to surfaces of side portions (or walls or sidewalls) 1304 and 1305, respectively, of enclosure 1302. Similarly, an assembly of DIS 1323 is coupled or attached to a surface of an upper portion (or ceiling) 1301 of enclosure 1302. Wings 1325 and 1326 of DIS 1323 are attached to surfaces of side portions (or walls or sidewalls) 1304 and 1305, respectively, of enclosure 1302. In some embodiments, DIS 1313 can be operatively coupled to DIS 1323. For example, DIS 1313 and DIS 1323 can be operatively coupled via a cable or wireless communication link. DIS 1313 and DIS 1323 can communicate one with another as part of an interrogation cycle to determine which RF tags have responded to an interrogation signal, and/or a position of the RF tags within container 1302. Such configurations can be useful, for example, to define or establish one or more interrogation zones throughout an enclosure such as a shipping container or other enclosure.

Figure 14:
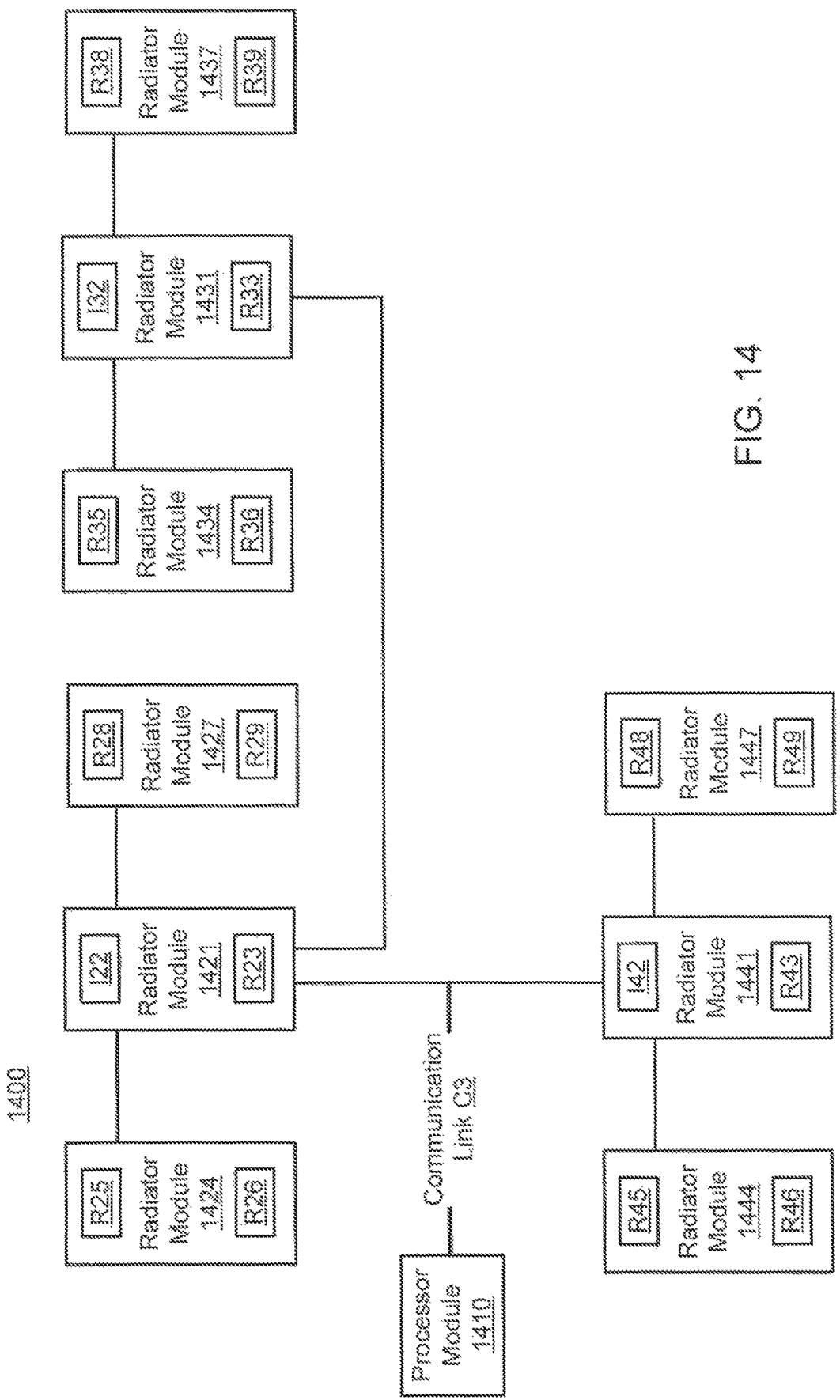
FIG. 14 is schematic diagram that illustrates an array of wings operably coupled to a body of a DIS, according to an embodiment.

FIG. 14 is schematic diagram that illustrates an array of wings operatively coupled to a body assembly (or control assembly) of a DIS, according to an embodiment. As shown in FIG. 14, an interrogator can be placed into the wings. In some embodiments, the interrogator can be removed from a body assembly and disposed within a wing assembly. In other embodiments, a body assembly includes an interrogator, and a wing assembly includes an interrogator. These wings can receive power from the body via cabling, or might receive power from a self-contained power source built within the wing assembly. Master wings ("masters"), which have interrogators, can be connected to and use wings without interrogators (can be referred to as slaves wings or "slaves") to extend the coverage and capabilities of the master wings. In this embodiment, a processor module (or control assembly) is connected to at least one master wing using a wired and/or wireless communication link. In some embodiments, the link can be a wired connection such as a power-over-Ethernet ("PoE") connection, a wireless connection such as a Bluetooth™ connection, or some other wired or wireless connection.

DIS 1400 includes processor module 1410 operatively coupled via communication link C3 to radiator modules 1421 and 1441. Radiator modules (or wing assemblies such as wing assembly 400 illustrated in FIGS. 4) 1421 and 1441 are masters and include interrogators 122 and 142, respectively. Additionally, radiator modules 1421 and 1441 include radiators R23 and R43, respectively. Radiator module 1421 is operatively coupled to radiator modules 1424 and 1427, which are slaves. That is, radiator modules 1424 and 1427 do not include interrogators, but do include radiators R25 and R26, and R28 and R29, respectively. Interrogator 122 can interrogate RFID module via any or all of radiators R23, R25, R26, R28, and/or R29.

Radiator module 1421 is also operatively coupled to radiator module 1431. Radiator modules 1421 and 1431 can be operatively coupled via a wired or a wireless connection. Radiator module 1431 is operatively coupled to radiator modules 1434 and 1437, which are slaves. That is, radiator modules 1434 and 1437 do not include interrogators, but do include radiators R35 and R36, and R38 and R39, respectively. Similarly, radiator module 1441 is operatively coupled to radiator modules 1444 and 1447, which are slaves. That is, radiator modules 1444 and 1447 do not include interrogators, but do include radiators R45 and R46, and R48 and R49, respectively.

In some embodiments a master wing can have a power supply independent from a power supply of processor module 1410, and can provide power to slaves from the mater's power supply. For example, masters can be operatively coupled to slaves via a wired connection to provide operational power or energy to slaves. In some embodiments, slaves receive power from a master in the form of an interrogation signal. That is, slaves can be passive radiator/receptors (e.g., antennas) that radiate interrogation signals provided by masters. In some embodiments, one master can provide operational power to another master. For example, radiator module 1421 can provide operational power to radiator module 1431 via a wired connection.

In some embodiments, processor module 1410 can detect radiator modules 1421, 1431, and 1441 (masters) when they are activated (e.g., powered on) or connected to processor module 1410. For example, radiator modules can have unique identifiers that can be received by processor module 1410 to determine that radiator modules are or can be operatively coupled to processor module 1410. In some embodiments, a master radiator module can periodically announce itself including its identifier, and processor module 1410 can receive the identifier. In some embodiments, a master radiator module can cease to announce itself after it has been operatively coupled to or associated with a processor module (such as processor module 1410). In some embodiments, processor module 1401 can poll for or request identifiers from master radiator modules to discover master radiator modules that are available. The master radiator modules can respond to the polling or requests with an identifier and/or other information if available to be associated with processor module 1410.

Processor module 1410 can receive the identifiers (or other information) and can send an association request including the identifier to each master radiator module. The master radiator modules can then associate with processor module 1410 such that the master radiator modules respond to interrogation and other commands from processor module. In some embodiments, this process can occur without input from a user such that a processor module and radiator module can be physically installed within an enclosure, the processor module and radiator modules physically connected and/or activated, and the DIS can automatically configure itself. In some embodiments, more or fewer radiator modules (masters and slaves) can be included in DIS 1400 than are illustrated in FIG. 14.

In some embodiments, wing assemblies (or radiator modules) can be physically or functionally expandable. For example, additional radiators can be coupled to a wing assembly to increase the size and/or sensitivity of the wing assembly. In some embodiments, a wing assembly can include a folding portion including one or more radiators that can be folded behind or in front of a main portion of the wing assembly. The folding portion can be unfolded to expose the additional one or more radiators and increase the size and/or sensitivity of the wing assembly. For example, in some embodiments a wing assembly is a fabric wing assembly such as a flexible material including one or more conductive portions configured to function or operate as radiators (or antennas). The fabric wing assembly can be folded onto itself for ease of storage, and unfolded and attached (e.g., using magnets or adhesives) when deployed in an enclosure. In some embodiments, a wing assembly can include a sliding portion including one or more radiators that can be slid behind or in front of a main portion of the wing assembly. The sliding portion can be slid from behind or in front of the main portion of the wing assembly to expose the additional one or more radiators and increase the size and/or sensitivity of the wing assembly.

In some embodiments, the components of elements of a DIS can be network devices in communication one with another via a network. For example, a processor module, radiator modules (or wings), communications modules, and/or a GPS module can each include a network interface module and can communicate one with another via the network interface modules. For example, the components of the DIS can form a network such as an Internet Protocol ("IP") network. In some embodiments, the network can include a network router, a network switch, a network hub, a network gateway, and/or a network bridge. For example, a processor module can include a network switch to which each of the network interface modules of the components of the DIS are operatively coupled. In some embodiments, the network can be automatically configured (e.g., DIS components can be discovered and assigned a network address or identifier and/or attributes) using, for example, the dynamic host configuration protocol ("DHCP"), a zero configuration network protocol such as the Internet Engineering Task Force ("IETF") Zeroconf, and/or other protocols of methods.

Figure 15:
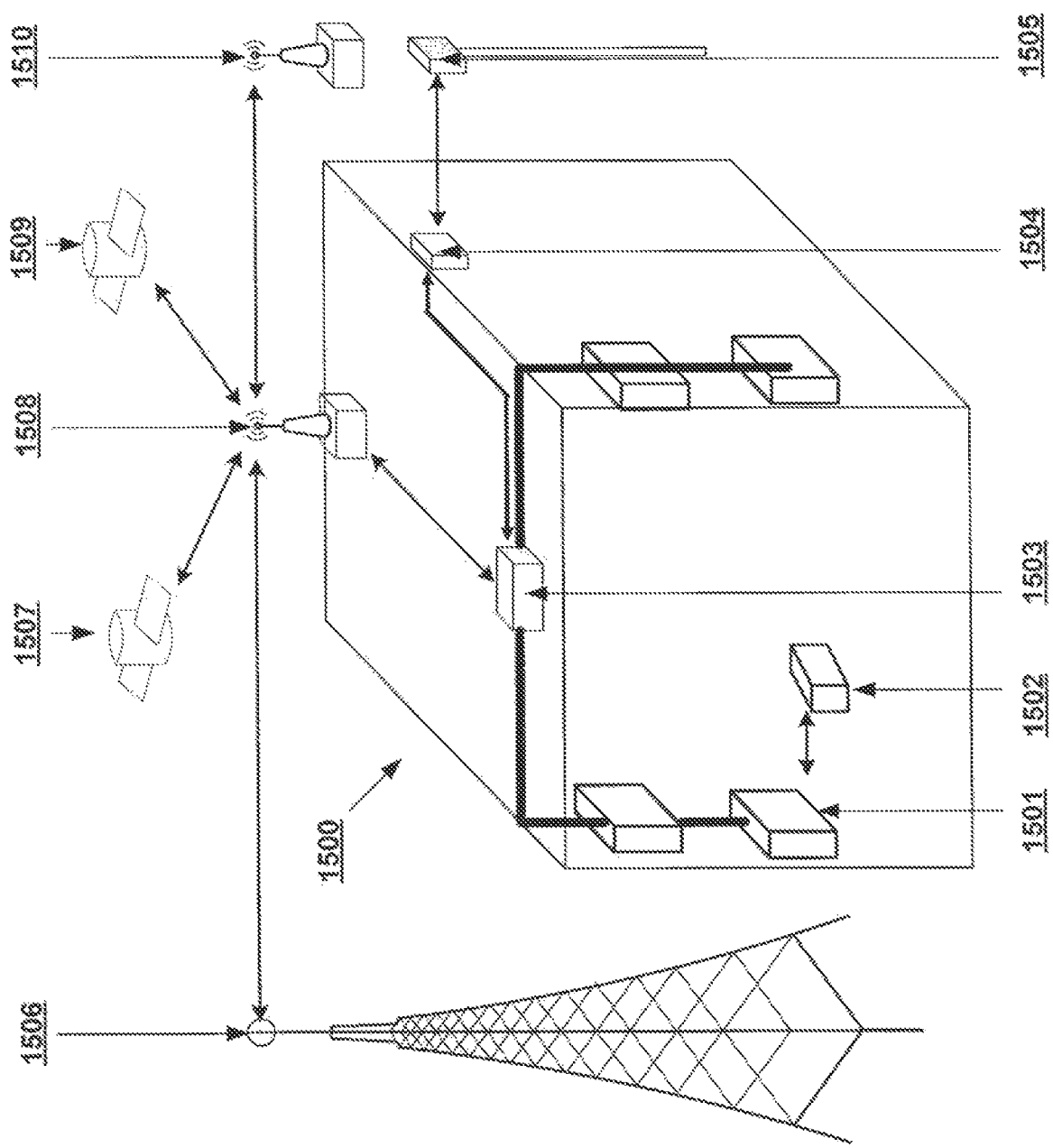
FIG. 15 illustrates various communication paths for communicating data captured from a DIS, according to an embodiment.

FIG. 15 illustrates various communication paths for communicating data captured from a DIS deployed within enclosure 1500, according to an embodiment. In some embodiments, the data can be inventory-related information (e.g., data communicating the inventory (type, quantity) within the enclosure after being determined by a DIS). The systems shown include a passive RFID antenna 1501, reader 1503, and RF tag 1502. Information gathered by this system is communicated through mechanisms including, for example, an active RFID system comprised of an active tag 1504 and reader 1505. Data may also be ported to users through a flexible communications module 1508 to mesh networks 1510, cellular networks 1506, and/or a satellite communications network 1509. The flexible communications module can also be configured to interface with a GPS satellite 1507.

In some embodiments, a DIS can be configured to use a metallic portion of an enclosure as an antenna for radiating RFID modules within the enclosure. For example, an RFID interrogator (or reader) module can be electrically coupled to a metallic surface of the enclosure via a transmission line, and the RFID interrogator module can transmit an interrogation (or RF) signal via the transmission line. The interrogation signal can be radiated from the metallic surface of the enclosure, and an interrogation response from an RFID module can be received at the RFID interrogator via the metallic surface and transmission line. In some embodiments, such a configuration can be used with a DIS without wing assemblies or with wing assemblies that do not include radiators. That is, the metallic surface of the enclosure can be used as a radiator. In some embodiments, a DIS can include wing assemblies that include radiators, and the metallic surface of the enclosure can be an additional radiator used by the interrogator.

Some embodiments relate to a computer storage product with a computer-readable medium (also referred to as a processor-readable medium) having instructions or computer code thereon for performing various computer-implemented operations. The media and computer code (also referred to as code) may be those specially designed and constructed for the specific purpose or purposes. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as optical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment may be implemented using Java, C++, or other object-oriented programming language and development tools. Additional examples of computer code include, but are not limited to, control signals, encrypted code, and compressed code.

In conclusion, the present embodiment provides, among other things, methods and apparatus for a deployable RFID system. Numerous variations and substitutions may be made in (and between) the various embodiments described herein. The uses and configurations of the various embodiments can be modified to achieve substantially the same results as achieved by the embodiments described herein. Accordingly, there is no intention to limit the embodiment to the disclosed exemplary forms, and many variations, modifications and alternative constructions fall within the scope and spirit of the description.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus for monitoring one or more radio-frequency identification (RFID) tags within an interrogation zone, the apparatus comprising:
   a control assembly that comprises at least one processor;
   a first wing assembly that is connected to a first side of the control assembly, about a first connection element, such that the first wing assembly is movable relative to the control assembly, wherein the first wing assembly comprises a first radiator configured to radiate RFID tags; and
   a second wing assembly that is connected to a second side of the control assembly, about a second connection element, such that the second wing assembly is movable relative to the control assembly, wherein the second side is opposite the first side, and wherein the second wing assembly comprises a second radiator configured to radiate RFID tags with a radio-frequency (RF) signal;
   wherein the control assembly, the first wing assembly, and the second wing assembly are configured to transition between
   an undeployed configuration in which the control assembly is substantially parallel to both the first wing assembly and the second wing assembly, and
   a deployed configuration in which the control assembly is substantially orthogonal to both the first wing assembly and the second wing assembly.

2. The apparatus of claim 1, wherein each of the first connection element and the second connection element comprise a hinge.

3. The apparatus of claim 2, wherein the hinge is a dual hinge.

4. The apparatus of claim 1, wherein each of the first connection element and the second connection element comprise a wire.

5. The apparatus of claim 4, wherein the first radiator is communicatively connected to the at least one processor via the wire of the first connection element, and wherein the second radiator is communicatively connected to the at least one processor via the wire of the second connection element.

6. The apparatus of claim 4, wherein each of the first wing assembly and the second wing assembly comprise a low-profile housing comprising:
   a face substrate through which RF signals propagate; and
   a backplane;
   wherein an end portion of the respective wire passes through a side surface between the face substrate and the backplane into a space between the face substrate and backplane and remains parallel to the face substrate and the backplane throughout the space.

7. The apparatus of claim 6, wherein the backplane comprises an attachment component configured to mount the low-profile housing to an external surface, such that the face substrate and the backplane are parallel to the external surface.

8. The apparatus of claim 7, wherein the attachment component comprises a magnet.

9. The apparatus of claim 7, wherein the attachment component comprises a screw.

10. The apparatus of claim 1, further comprising a locking mechanism configured to lock the first wing assembly and the second wing assembly in one or both of the undeployed configuration and the deployed configuration.

11. The apparatus of claim 1, wherein each of the first wing assembly and the second wing assembly comprises a fabric body.

12. The apparatus of claim 1, wherein the control assembly comprises an interrogator that is electrically coupled to the first radiator of the first wing assembly and the second radiator of the second wing assembly, and wherein the interrogator is configured to generate an RF signal that is radiated by the first radiator and the second radiator.

13. The apparatus of claim 1, wherein the control assembly comprises an interrogator that is electrically coupled to the first radiator of the first wing assembly and the second radiator of the second wing assembly, wherein the interrogator is configured to simultaneously generate an RF signal that is radiated by the first radiator and a second RF signal that is radiated by the second radiator, and wherein the first RF signal and the second RF signal are different.

14. The apparatus of claim 1, wherein each of the first wing assembly and the second wing assembly comprises an interrogator that is communicatively connected to the at least one processor of the control assembly, wherein the interrogator of the first wing assembly is configured to, based on a communication from the at least one processor, generate an RF signal that is radiated by the first radiator, and wherein the interrogator of the second wing assembly is configured to, based on a communication from the at least one processor, generate an RF signal that is radiated by the second radiator.

15. The apparatus of claim 14, further comprising one or more slave wing assemblies, wherein each of the one or more slave wing assemblies is directly connected to one of the first wing assembly or the second wing assembly, and wherein each of the one or more slave wing assemblies comprises a radiator configured to radiate the RF signal generated by the interrogator of the one of the first wing assembly and the second wing assembly to which it is directly connected.

16. The apparatus of claim 1, further comprising one or more slave wing assemblies, wherein each of the one or more slave wing assemblies is directly connected to one of the first wing assembly or the second wing assembly, and is not directly connected to the control assembly, and wherein each of the one or more slave wing assemblies comprises a radiator.

17. The apparatus of claim 1, wherein the at least one processor of the control assembly is configured to:
control the first wing assembly and the second wing assembly to radiate RF signals to interrogate RFID tags;
receive results of interrogation responses from the interrogation of RFID tags; and
increase a strength of the RF signals to improve interrogation responses.

18. The apparatus of claim 17, wherein the at least one processor of the control assembly is further configured to lower the strength of the RF signals to a level that provides acceptable interrogation responses and reduces power consumption of the apparatus.

19. The apparatus of claim 17, wherein the at least one processor is configured to control an external antenna to wirelessly transmit the results of interrogation responses to an external system.

20. The apparatus of claim 17, wherein the at least one processor of the control assembly is configured to control the first wing assembly and the second wing assembly to radiate RF signals to interrogate RFID tags in response to a trigger.

* * * * *